(12) United States Patent
Digonnet et al.

(10) Patent No.: US 6,282,341 B1
(45) Date of Patent: Aug. 28, 2001

(54) TUNABLE, MECHANICALLY INDUCED LONG-PERIOD FIBER GRATING WITH ENHANCED POLARIZING CHARACTERISTICS

(75) Inventors: Michel J. F. Digonnet, Palo Alto, CA (US); Silviu Savin, London (GB); Gordon S. Kino; H. John Shaw, both of Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/469,744

(22) Filed: Dec. 21, 1999

Related U.S. Application Data
(60) Provisional application No. 60/113,298, filed on Dec. 22, 1998.

(51) Int. Cl.[7] .................................................. G02B 6/34
(52) U.S. Cl. .......................... 385/37; 385/10; 385/11; 385/28; 359/130
(58) Field of Search ............................... 385/37, 11, 12, 385/1–10, 24, 28, 123; 359/130

(56) References Cited

U.S. PATENT DOCUMENTS

| | | | |
|---|---|---|---|
| 5,430,817 | 7/1995 | Vengsarkar | 385/37 |
| 5,647,039 | 7/1997 | Judkins et al. | 385/37 |
| 5,703,978 | 12/1997 | DiGiovanni et al. | 385/37 |
| 6,141,470 | * 10/2000 | Espindola et al. | 385/37 |
| 6,148,128 | * 11/2000 | Jin et al. | 385/37 |

OTHER PUBLICATIONS

A. Kumar, et al., Birefringence of optical fiber pressed into a V groove, *Optics Letters*, vol. 6, No. 12, Dec. 1981, pp. 644–646.

R. Ulrich, Polarization and Depolarization in the Fiber–Optic Gyroscope, (Section 4., Birefringence Effects in Optical Fibers), *Fiber–Optic Rotation Sensors and Related Technologies*, S. Ezekial and H.J. Arditty, Eds., Springer–Verlag, 1982, pp. 65–68.

R.C. Youngquist, et al., Birefringent–fiber polarization coupler, *Optics Letters*, vol. 8, Dec. 1983, pp. 656–658.

R.C. Youngquist, et al., Two–mode fiber modal coupler, *Optics Letters*, vol. 9, May 1984, pp. 177–179.

(List continued on next page.)

*Primary Examiner*—Phan T. H. Palmer
(74) *Attorney, Agent, or Firm*—Knobbe, Martens, Olson & Bear, LLP

(57) ABSTRACT

A new type of fiber filter is useable in optical communication systems. In particular, the fiber filter may be used to flatten the gain of erbium-doped fiber amplifiers (EDFAs). Such gain flattening is important for long-haul, dense (wavelength dependent multiplexed) WDM communication systems. The filter includes a periodic mechanical structure pressed against the side of a single-mode fiber to induce a wavelength-dependent loss in a signal propagating in the fiber core by coupling the signal to fiber cladding modes. The mechanical structure is a periodic comb of small ridges. Each ridge induces a local index change in the fiber via the photoelastic effect. For coupling to the right cladding modes, the period of the grating (and the comb) is in the range of few hundreds of microns. Thus, the grating is easy to fabricate with standard machining equipment.

95 Claims, 16 Drawing Sheets

OTHER PUBLICATIONS

M. Tachibana, et al., Gain Shaped Erbium–Doped Fibre Amplifier (EDFA) With Broad Spectral Bandwidth, *Spectral Gain Characteristics and Modeling of Fiber Amplifiers, Steinbeck Forum,* MD 1, Aug. 6, 1990, pp. 44–47.

M. Tachibana, et al., Erbium–Doped Fiber Amplifier with Flattened Gain Spectrum, *IEEE Photonics Technology Letters,* vol. 3, Feb. 1991, pp. 118–120.

P.J. Lemaire, et al., High Pressure $H_2$ Loading As A Technique For Achieving Ultrahigh UV Photosensitivity and Thermal Sensitivity in $GeO_2$ Doped Optical Fibres, *Electronics Letters,* vol. 29, No. 13, Jun. 24, 1993, pp. 1191–1193.

Ashish M. Vengsarkar, et al., Fiber–Optic Dual Technique Sensor for Simultaneous Measurement of Strain and Temperature, *Journal of Lightwave Technology,* vol. 12, No. 1, Jan. 1994, pp. 170–177.

Ashish M. Vengsarkar, et al., Long–Period Fiber Gratings as Band–Rejection Filters, *Journal of Lightwave Technology,* vol. 14, No. 1, Jan. 1996, pp. 58–65.

Ashish M. Vengsarkar, et al., Long–period fiber–grating––based gain equalizers, *Optics Letters,* vol. 21, No. 5, Mar. 1, 1996, pp. 336–338.

Vikram Bhatia, et al. Temperature–insensitive and strain–insensitive long–period grating sensors for smart structures, *Optical Engineering,* vol. 36, No. 7, Jul. 1997, pp. 1872–1875.

T. Enomoto, et al., Long–period fiber grating in a pure–silica–core fiber written by residual stress relaxation, *Proceedings of Optical Communication Conference OFC' 98,* 1998 OSA Technical Digest Series vol. 2, pp. 277–278.

M.K. Davis, et al., Thermal Effects in Doped Fibers, *Journal of Lightwave Technology,* vol. 16, No. 6, Jun. 1998, pp. 1013–1023.

* cited by examiner

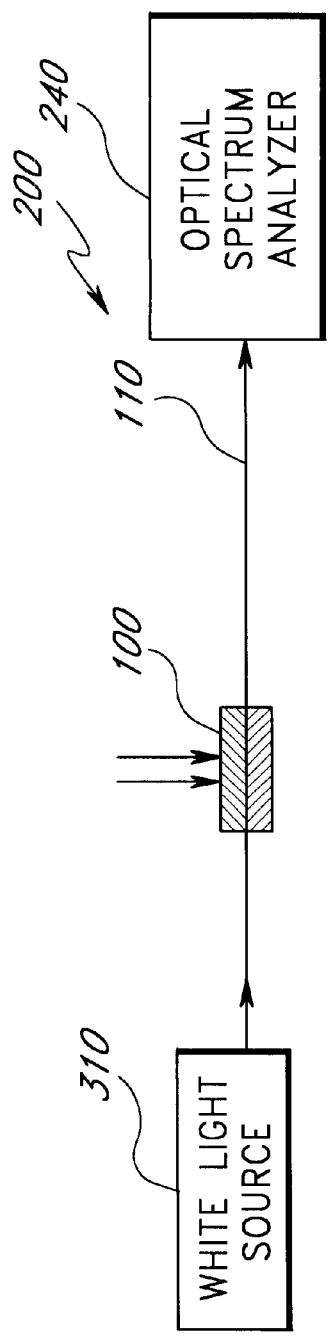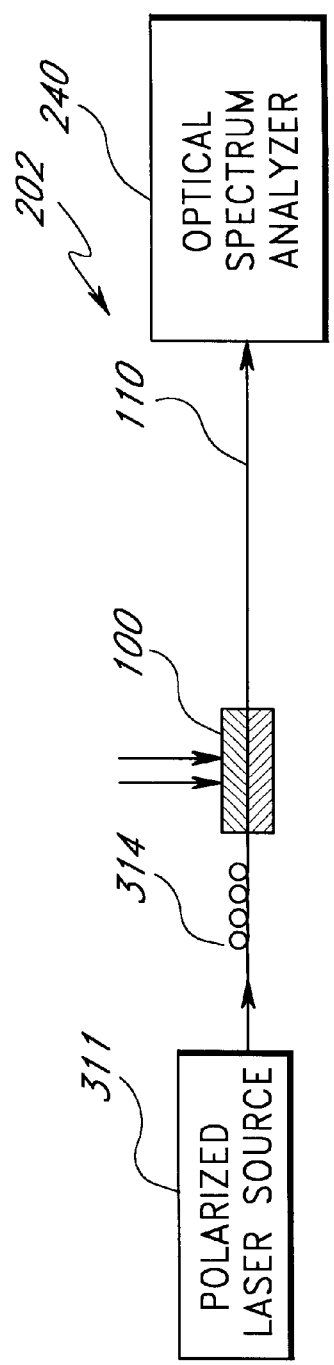

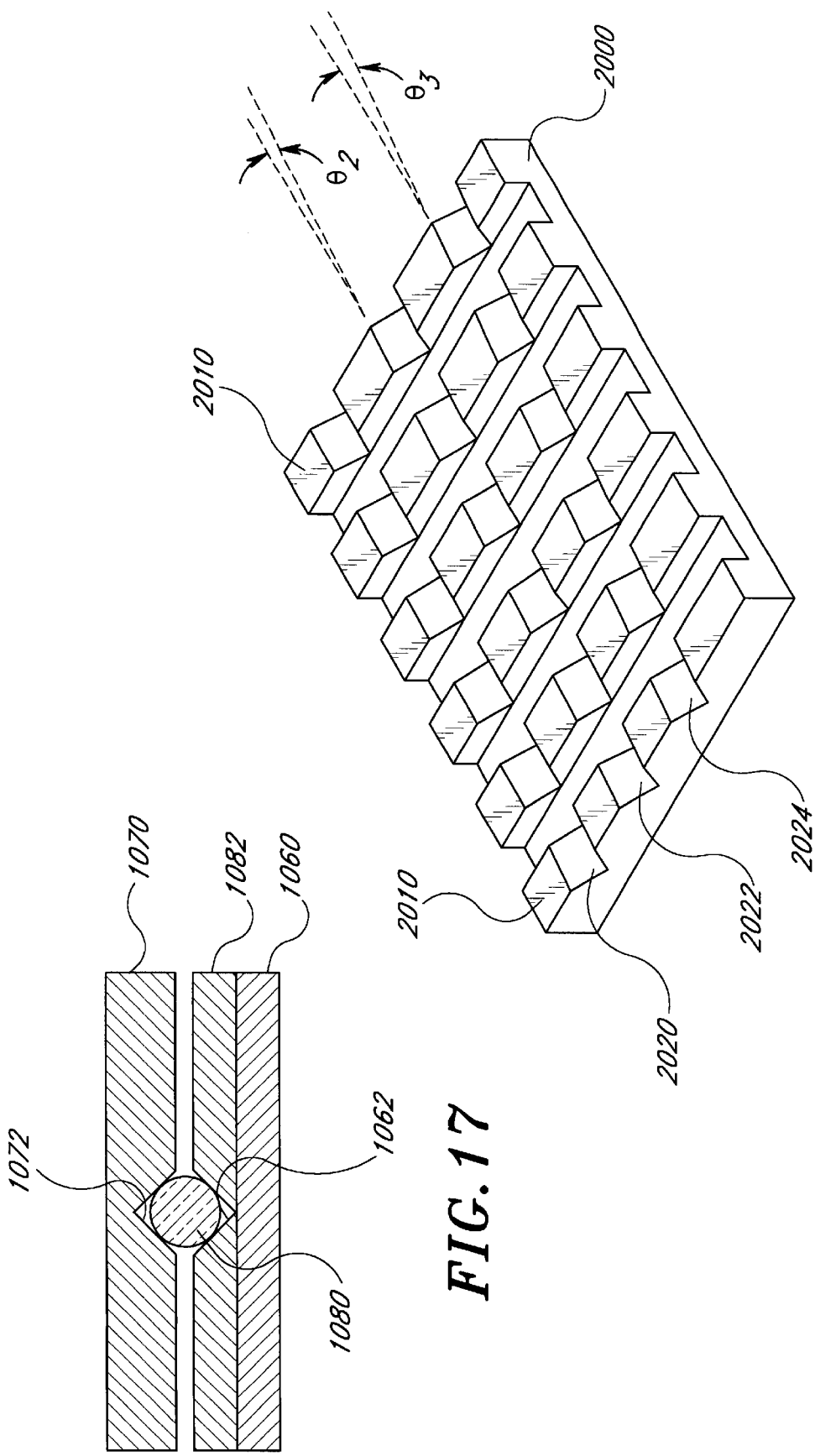

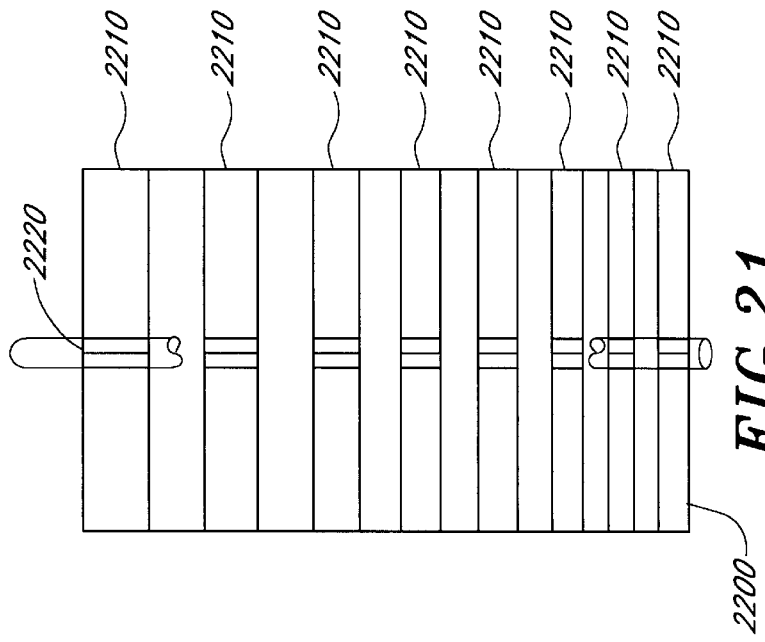
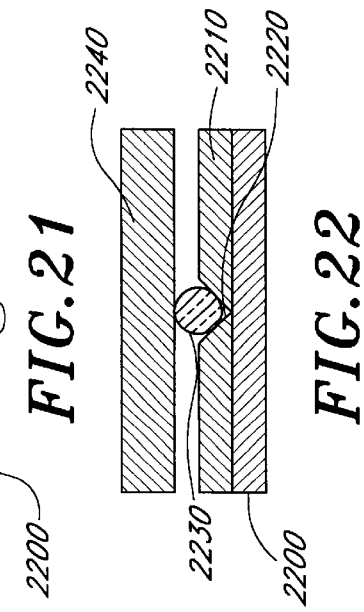
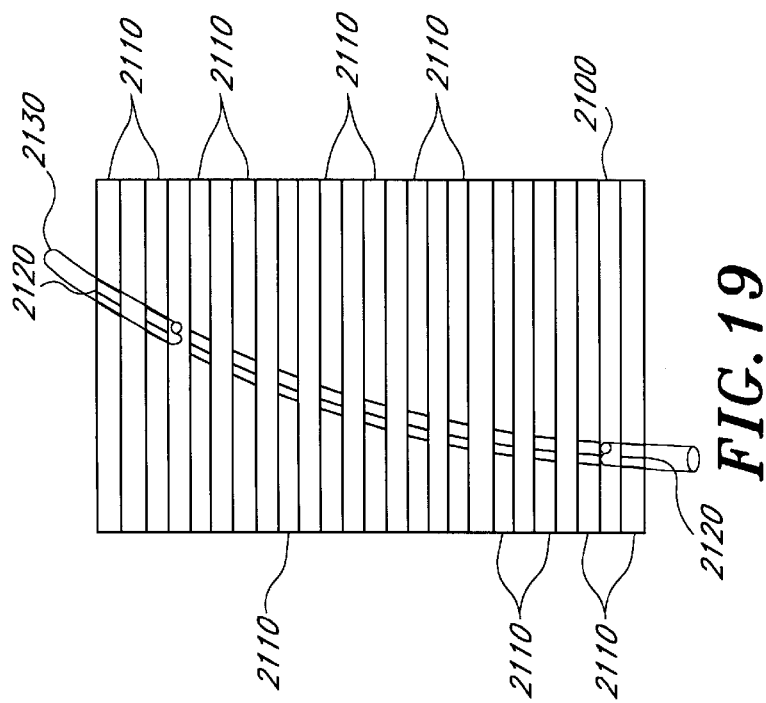
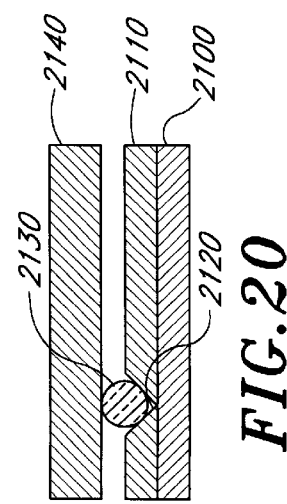
FIG. 19
FIG. 20
FIG. 21
FIG. 22

TUNABLE, MECHANICALLY INDUCED LONG-PERIOD FIBER GRATING WITH ENHANCED POLARIZING CHARACTERISTICS

The present application claims the benefit of Provisional Application No. 60/113,298 filed Dec. 22, 1998, which is hereby incorporated by reference herein.

BACKGROUND OF THE INVENTION

1. Field of the Invention

The present invention is in the field of passive filtering of optical signals, e.g., in optical amplifiers, such as erbium-doped fiber amplifiers (EDFAs).

2. Description of the Related Art

Long period fiber gratings are described, for example, in A. M. Vengsarkar, et al., *Long-Period Fiber Gratings as Band-Rejection Filters*, Journal of Lightwave Technology Vol. 14, No. 1, January 1996, pp. 58–65. Such long-period fiber gratings are quickly becoming the filters of choice in several important communication applications. In particular, such filters are used to flatten the gain of EDFAs. The long-period fiber grating is based on the same principle and is fabricated with the same technology as standard reflection fiber gratings, which were invented nearly two decades ago. In a reflection fiber grating, a spatially modulated UV laser beam is launched onto one side of a single-mode fiber. Via complex mechanisms, now relatively well understood, the regions of the fiber exposed to a high UV intensity experience a refractive index change $\Delta n$ in the vicinity of the core of the fiber, whereas the regions of the fiber receiving a low UV intensity experience a relatively small refractive index change. Thus, the fiber core index is periodically changed by $\Delta n$ with a spatial period $\Lambda$ equal to the period of the spatially modulated UV beam.

To support a grating of the above-described type, the fiber must be sensitive to the UV, a property generally known as photosensitivity. The presence of sufficiently strong photosensitivity to form gratings generally requires the core to be doped with germanium oxide. The photosensitivity of fibers can also be enhanced, as described, for example, in P. J. Lemaire, et al., *High pressure $H_2$ loading as a technique for achieving ultrahigh UV photosensitivity and thermal sensitivity in $GeO_2$ doped optical fibres*, Electronics Letters, Vol. 29, No. 13, June 1993, pp. 1191–1193. Photosensitivity can be induced in non-Ge-doped fibers by loading the fiber with hydrogen prior to UV exposure.

In photosensitive reflection fiber gratings, the period $\Lambda$ is selected such that the signal traveling in the core (the fundamental mode $LP_{01}$) is coupled to the $LP_{01}$ mode traveling in the other direction. Thus, the forward-traveling signal is coupled (partially or fully, depending on the grating) to the backward-traveling signal. The grating acts as a reflector. For this reflection to take place, $\Lambda$ must be fairly small. For example, $\Lambda$ should be on the order of a fraction of the signal wavelength.

In the second type of photosensitive fiber gratings, the long-period grating, the forward $LP_{01}$ signal mode is not coupled to the backward mode. Instead, the forward $LP_{01}$ signal mode is coupled to a cladding mode. Since the cladding modes are strongly attenuated by the jacket surrounding the fiber, the $LP_{01}$ mode is attenuated. However, if a broadband signal travels in the fiber, for a given period $\Lambda$, only certain wavelengths will be coupled to cladding modes. For other wavelengths, there may be no cladding modes to which the signals at those wavelengths can be coupled. Thus, the signals at those wavelengths experience no loss. Therefore, the grating attenuates only some wavelengths (i.e., the grating acts as a wavelength-dependent filter). To couple the $LP_{01}$ mode to a cladding mode, the period $\Lambda$ for a long-period grating must be much longer than $\Lambda$ for a reflective grating. Typically, $\Lambda$ for a long-period grating is on the order of tens to several hundred microns. The transmission versus wavelength of such long-period grating filters exhibits multiple transmission notches or dips. By appropriately selecting $\Delta n$, $\Lambda$, and the grating length, the depth and (nearly periodic) location of the various dips in the filter function can be advantageously controlled.

Long-period gratings are especially important to flatten the gain of an EDFA. A standard scheme is to place a filter with a suitable filter function at some optimum location near the EDFA. It turns out that for EDFAs, the desired filter functions exhibit the kind of shape and amplitude that can easily be generated with a long-period fiber grating.

One difficulty with these exemplary long-period fiber gratings is that an expensive UV laser is required to fabricate the gratings. For example, an excimer laser having a wavelength around 248 nanometers and costing approximately $60,000 has been utilized to fabricate such gratings. The fabrication of fiber gratings is consequently reserved to the relatively few laboratories having such equipment. A second difficulty is that the response of a fiber to a particular UV exposure depends strongly on the chemistry, the composition and the thermal history of the fiber in ways that are too complex to model and that must be determined empirically. Thus, the fabrication process is not easily reproducible from one fiber to the next. When presented with the task of fabricating a particular long-period fiber grating filter in a particular fiber, manufacturers must go through several iterations, often based on trial and error, which adds cost and delays to the manufacturing of such filters. A third difficulty is that reproducibility requires particularly careful control of the UV laser power and fiber parameters, which can be difficult.

There are other ways of constructing long period fiber gratings. One is to arc (with an electrical arc, e.g., from a commercial fiber splicer) across the fiber, which locally releases the stress built into the fiber and locally modifies the index. The process is repeated at regular intervals, with a period $\Lambda$, along a length L of fiber. Another method is to arc and pull the fiber slightly, which deforms it a little and thus perturbs the mode index. These two methods work for any fiber without prior processing (unlike photosensitive gratings) but they are also permanent. However, a main practical difficulty that arises in the manufacturing of long period fiber gratings is that the transmission function of the fiber is difficult to control since it depends on the difference between two large numbers of comparable magnitude, namely $n_{\it eff}$ and $n_{cl}^m$, which are the effective index of the $LP_{01}$ core mode and the effective index of the $m^{th}$ cladding mode, respectively. (See Equation (1) below.) Both $n_{\it eff}$ and $n_{cl}^m$ depend strongly on fiber parameters, and small variations in either or both of these indices that would have little effect in a reflection grating have a large effect on the long period fiber grating's wavelengths of peak attenuation, making it difficult to reproducibly manufacture gratings of a desired transmission.

Another kind of fiber device relevant to the present invention is a periodically stressed device, like the ones invented at Stanford University in the 1980s. (See, for example, R. C. Youngquist, et al., *Two-mode fiber modal coupler*, Optics Letters, Vol. 9, No. 5, May 1984, pp. 177–179; and R. C. Youngquist, et al., *Birefringent-fiber* polarization coupler, *Optics Letters,* Vol. 8, No. 12, December 1993, pp. 656–658.) When pressure is applied to a glass fiber, its core is deformed. Also, the index of the fiber changes via the photoelastic effect. The first effect has been used in a two-mode fiber to produce a mode coupler. (See Youngquist, et al., Two-mode fiber modal coupler, cited above.) A two-mode fiber is a fiber in which light can propagate in one or both of two transverse modes (e.g., the $LP_{01}$ mode and the second-order mode $LP_{11}$). Pressure is applied periodically along the fiber by pressing a mechanical plate against the fiber. The metal plate is made of a periodic comb of square ridges. Each ridge locally squeezes and deforms the fiber. At the beginning and at the end of each stressed region, the deformation couples a little power from the $LP_{01}$ to the $LP_{11}$ mode. For this effect to accumulate and to cause the transfer of substantial power between modes, the phase between coupling points must be correct. In particular, the ridge period must be substantially equal to the beat length between the two modes. For example, the device demonstrated in Youngquist, et al., *Two-mode fiber modal coupler,* cited above, had a proper period of approximately 430 microns and produced up to 40 dB coupling from the $LP_{01}$ mode to the $LP_{11}$ mode.

The second effect is index change with pressure. The second effect has been used to produce a polarization coupler using a high-birefringence fiber. (A high birefringence fiber is a fiber in which light can propagate in one or both of two well-defined linear polarizations.) The polarization coupler couples substantially all the power from one polarization to the other. (See, for example, Youngquist, et al., *Birefringent-fiber polarization coupler,* cited above.) For such strong coupling to take place, a mechanical plate made of a periodic comb of square ridges is pressed against o the fiber. Preferably, the comb is placed at 45° to the fiber birefringence axes. Each ridge causes an asymmetric perturbation in the fiber index, which perturbs the birefringence of the fiber in the portion affected by the comb. The index perturbation allows a small amount of coupling to take place at the beginning and at the end of each stress region. Full coupling occurs when the period of the stress region is equal to the beat length between the two polarization modes. The described device has a ridge period of approximately 820 microns and yields up to 25 dB coupling of one polarization to the other. (See, Youngquist, et al., *Birefringent-fiber polarization coupler,* cited above.)

Tachibana et al. constructed optical notch filters having lengths of 220 mm and 390 mm by sandwiching a segment of amplifier fiber between a mechanical grating and a flat plate. (See, Tachibana, et al., *Gain-shaped erbium-doped fibre amplifier (EDFA) with broad spectral bandwidth,* Proceedings of Conference on Optical Amplifiers and their Applications, Optical Society of America Trends in Optics and Photonics Series, MDI, pp. 44–47, Aug. 6, 1990; Tachibana, et al., *Erbium-doped fiber amplifier with flattened gain spectrum,* IEEE Photonics Technology Letters, vol. 3, pp. 118–120, February 1991.) However, these lengths may be unsuitable for certain applications. Furthermore, the configuration suggested in these references is polarization dependent, which is unsuitable for amplifier applications.

SUMMARY OF THE INVENTION

Embodiments are described below which are directed to a class of all-fiber filters that produce similar filter functions to those of photosensitive and fused long-period fiber gratings. A filter in accordance with the present invention is simple and fast to fabricate, can be removed easily, does not require capital intensive equipment, is adjustable, and is potentially easy to mass produce. Like most all-fiber devices, a filter in accordance with the present invention exhibits very low loss.

In one embodiment, there is provided a method of forming an optical filter, which includes applying pressure at various points along a segment of an optical waveguide to induce perturbations in the refractive index and create a grating within the waveguide. The segment is advantageously less than approximately 2 inches in length. The pressure and relative spacings between the pressure points are selected such that optical radiation passing through the waveguide is more strongly attenuated at some wavelengths than at other wavelengths.

Another embodiment is an optical filter which includes an optical waveguide. The optical filter further includes a device for maintaining pressure along less than about 5 cm of the waveguide to induce local changes in the index of refraction. The induced changes in the index of refraction create an optical grating within the waveguide that attenuates optical radiation passing through the waveguide more strongly at some wavelengths than at other wavelengths.

In another embodiment, there is provided a method of forming an optical filter, which includes applying pressure at various points along a segment of an optical waveguide having a cladding, in order to induce perturbations in the refractive index and create a grating within the optical waveguide. The segment is advantageously less than approximately 5 cm in length. The method also includes selecting the pressure and the relative spacings between the pressure points such that optical radiation passing through the optical waveguide is more strongly coupled into the cladding at some wavelengths than at other wavelengths, so that the waveguide acts as an optical filter.

In another embodiment, there is provided a method of forming an optical filter having reduced polarization dependence, which includes applying pressure to an optical waveguide by pressing the waveguide into a plurality of periodically spaced grooves that are generally V-shaped. The applied pressure induces perturbations in the refractive index of the waveguide to create a grating within the waveguide, and the pressure is applied in substantially equal measure between orthogonal axes. The method also includes selecting the relative spacings between the pressure points such that optical radiation passing through the waveguide is more strongly attenuated at some wavelengths than at other wavelengths, so that the waveguide acts as an optical filter.

Yet another embodiment is an optical filter which includes an optical waveguide. The optical filter also includes a device for maintaining pressure along the waveguide to induce local changes in the index of refraction. The induced changes in the index of refraction create an optical grating within the waveguide that attenuates optical radiation passing through the waveguide more strongly at some wavelengths than at other wavelengths. The device has periodically spaced, generally V-shaped grooves for receiving the waveguide, in which the V-shaped grooves cause the pressure to be applied substantially symmetrically to the filter to reduce the polarization dependence of the filter.

In another embodiment, there is provided a method of forming an optical filter, which includes applying pressure to an optical waveguide by pressing the waveguide into a groove that passes through a plurality of periodically spaced ridges. The groove is generally V-shaped within the ridges, with the applied pressure inducing perturbations in the refractive index of the waveguide to create a grating within the waveguide. The pressure is applied substantially equally between orthogonal axes of the waveguide. The method also includes selecting the relative spacings between the ridges such that optical radiation passing through the waveguide is more strongly attenuated at some wavelengths than at other wavelengths, so that the waveguide acts as an optical filter.

Yet another embodiment is an optical filter which includes an optical waveguide and a device for maintaining pressure along the waveguide to induce local changes in the index of refraction. The induced changes in the index of refraction create an optical grating within the waveguide that attenuates optical radiation passing through the waveguide more strongly at some wavelengths than at other wavelengths. The device has at least one groove for receiving the waveguide that passes through a plurality of periodically spaced ridges where the groove is generally V-shaped. The groove causes the pressure to be applied substantially equally between orthogonal axes of the waveguide.

Still another embodiment is a method of forming an optical chirped grating which includes applying pressure at various points along an optical waveguide to induce perturbations in the refractive index and create a grating within the waveguide. The method also includes selecting the relative spacings between the pressure points such that optical radiation passing through the waveguide is more strongly attenuated at some wavelengths than at other wavelengths, so that the waveguide acts as an optical filter. The relative spacings are selected to be aperiodic to broaden the linewidth of the attenuation of the filter.

Another embodiment of the invention is an optical chirped grating which includes an optical waveguide and a device for maintaining pressure along the waveguide to induce local changes in the index of refraction. The induced changes in the index of refraction create an optical grating within the waveguide that attenuates optical radiation passing through the waveguide more strongly at some wavelengths than at other wavelengths. The pressure is advantageously applied to the waveguide aperiodically.

Yet another embodiment of the invention is an optical filter that includes an optical waveguide having a core for propagating a fundamental mode and further includes a cladding surrounding the core. The filter also includes a first device for maintaining pressure at a first plurality of periodically spaced pressure points along the waveguide so that the index of the waveguide is perturbed periodically. The period between the first pressure points and the pressure applied to the first pressure points are selected to couple the fundamental mode to a cladding mode of the cladding. The filter also includes a second device for maintaining pressure at a second plurality of periodically spaced pressure points along the waveguide so that the index of the waveguide is perturbed periodically. The period between the second pressure points and the pressure applied to the second pressure points are selected to couple the fundamental mode to a cladding mode of the cladding. The pressure applied by the first device and the pressure applied by the second device are applied in different directions to reduce the polarization dependence of light transmitted through the filter.

In another embodiment of the invention there is provided an optical filter that includes an optical waveguide which includes a core and a cladding. The filter also includes a device for maintaining pressure at a plurality of points periodically spaced along the waveguide. The pressure induces perturbations in the refractive index of the waveguide and creates an optical grating within the waveguide, so that a fundamental mode of the core of the waveguide is coupled to a cladding mode of the waveguide more strongly at some wavelengths than at other wavelengths to produce an optical filter. The device applies pressure to the waveguide with azimuthal symmetry that is at least 3-fold, so that light incident on the waveguide passes through the waveguide substantially independently of the polarization of the incident light.

Still another embodiment is a method of forming an optical filter which includes providing an optical waveguide that includes a core and a cladding. The method also includes applying pressure at a plurality of points along the waveguide to induce perturbations in the refractive index and create an optical grating within the waveguide. In this way a fundamental mode of the core of the waveguide is coupled to a cladding mode of the waveguide more strongly at some wavelengths than at other wavelengths. The pressure is applied with sufficient azimuthal symmetry to substantially reduce the polarization dependence of light passing through the waveguide.

A further embodiment of the invention is an optical filter that includes an optical waveguide that includes a core and a cladding. The filter also includes a device for maintaining pressure at a plurality of points aperiodically spaced along the waveguide. The pressure induces perturbations in the refractive index of the waveguide and creates a chirped optical grating within the waveguide. A fundamental mode of the core of the waveguide is coupled to a cladding mode of the waveguide more strongly at some wavelengths than at other wavelengths to produce an optical filter.

Yet another embodiment is an optical polarizer. The polarizer includes a high-birefringence optical waveguide having birefringence axes. The polarizer also includes a device for applying pressure at various points along the waveguide to induce local changes in the index of refraction. The induced changes in the index of refraction create an optical grating within the waveguide that attenuates optical radiation passing through the waveguide more strongly at some wavelengths than at other wavelengths. The more strongly attenuated optical radiation has a polarization state different from the optical radiation at the other wavelengths transmitted by the waveguide.

Still another embodiment is an optical polarizer that includes an integrated optic waveguide for propagating a fundamental mode and a substrate mode. The polarizer also includes a plate having ridges pressed against the waveguide. The ridges apply pressure at points along the waveguide so that, for light within a given bandwidth, a first polarization of the light is coupled more strongly from the fundamental mode to the substrate mode than is the polarization of light orthogonal to the first polarization. This leads to preferential attenuation of the first polarization of the light.

Still another embodiment is an optical filter that includes an integrated optic waveguide for propagating a fundamental mode and a substrate mode. The filter also includes a plate having ridges pressed against the waveguide. The ridges apply pressure at points along the waveguide so that, for light coupled into the waveguide, a first bandwidth of the light is coupled more strongly from the fundamental mode to the substrate mode than is a second bandwidth of the light, thereby leading to preferential attenuation of the first bandwidth of the light.

Yet another embodiment is an optical filter that includes an optical waveguide and a device for maintaining pressure along at least a portion of the waveguide. The device includes rows of ridges, with the ridges contacting the waveguide at various points along the waveguide to induce local changes in the index of refraction. The induced changes in the index of refraction create an optical grating within the waveguide that attenuates optical radiation passing through the waveguide more strongly at some wavelengths than at other wavelengths. The rows are periodically spaced from each other such that the points are periodically spaced from each other. The rows have different lengths such that the length of the portion over which pressure is maintained can be varied by positioning the waveguide at different locations on the device without changing the periodicity between the points.

Still another embodiment is a method of forming an optical filter which includes applying tension to an optical waveguide to avoid microbending in the waveguide and thereby reduce optical losses. The method also includes applying pressure at various points along a segment of the waveguide to induce perturbations in the refractive index and create a grating within the waveguide. The method includes selecting the pressure and relative spacings between the pressure points such that optical radiation passing through the waveguide is more strongly attenuated at some wavelengths than at other wavelengths.

Still another embodiment is an optical filter that includes an optical waveguide; and a device for maintaining pressure along at least a portion of the waveguide. The device includes ridges which contact the waveguide at various points to induce local changes in the index of refraction. The induced changes in the index of refraction create an optical grating within the waveguide that attenuates optical radiation passing through the waveguide more strongly at some wavelengths than at other wavelengths. The ridges have generally rounded corners to avoid microbending in the waveguide and thereby reduce optical losses within the waveguide.

Yet another embodiment is an optical filter that includes an optical waveguide and a device for maintaining pressure along at least a portion of the waveguide. The device includes rows of ridges, in which the ridges are intersected by a plurality of grooves passing through the ridges which accept the waveguide. The ridges apply pressure to the waveguide to induce local changes in the index of refraction. The induced changes in the index of refraction create an optical grating within the waveguide that attenuates optical radiation passing through the waveguide more strongly at some wavelengths than at other wavelengths.

Still another embodiment is a method of forming an optical polarizer that includes providing a polarization-maintaining optical waveguide having birefringence axes, with the waveguide propagating a fundamental mode and a substrate mode. The method also includes creating an optical grating within the waveguide by applying pressure at various points along the waveguide to induce changes in the index of refraction in the waveguide. The pressure is applied such that a first polarization of optical radiation within a given bandwidth is more strongly coupled from the fundamental mode to the substrate mode than is the orthogonal polarization of optical radiation within the bandwidth. This leads to preferential attenuation of the first polarization of the optical radiation within the bandwidth.

Another embodiment of the invention is a method of varying the relative strength of attenuation peaks in a filter. The method includes applying pressure at various points along a segment of an optical waveguide to induce perturbations in the refractive index and create a grating within the waveguide. The method also includes selecting the pressure and relative spacings between the pressure points such that optical radiation passing through the waveguide is more strongly attenuated at some wavelengths than at other wavelengths. The attenuation strength at one wavelength and the attenuation strength at another wavelength define a relative magnitude of the attenuation strengths of the one and the another wavelengths, and the applied pressure is varied to change the relative magnitude of the attenuation strengths.

Still another embodiment is a method of forming a temperature insensitive optical filter. The method includes applying pressure at various points along a segment of an optical waveguide to induce perturbations in the refractive index and create a grating within the waveguide. The optical waveguide includes a core which propagates a fundamental mode and a cladding surrounding the core which propagates cladding modes. The cladding has an index profile selected such that the cladding modes and the fundamental mode of the core have substantially identical effective index temperature dependence. The method further includes selecting the pressure and relative spacings between the pressure points such that the fundamental mode is coupled to a cladding mode more strongly, and thereby is more strongly attenuated, at some wavelengths than at other wavelengths. The filter has a transmission spectrum exhibiting a temperature dependence that is reduced by the index profiles of the cladding and the core.

In preferred embodiments of the invention described herein, the optical waveguide includes an optical fiber, and in still more preferred embodiments, this optical fiber is a single-mode optical fiber.

BRIEF DESCRIPTION OF THE DRAWINGS

The present invention will be described below in connection with the accompanying drawing figures in which:

FIGS. 3A and 3B illustrate experimental systems for measuring the transmission properties of a fiber subjected to period variations in pressure using unpolarized and polarized light sources, respectively;

FIGS. 16 and 17 illustrate another embodiment for reducing the polarization dependence of a fiber's attenuation, in which the fiber resides between two V-shaped grooves;

FIG. 18 illustrates an embodiment, which includes several grooves, with each groove having its own periodicity;

FIGS. 19 and 20 illustrate plan and cross-sectional views, respectively, of an embodiment in which a fiber experiences pressure points which are spaced aperiodically from each other to produce a broadened fiber polarizer, with the pressure points being located along ridges spaced periodically from each other;

FIGS. 21 and 22 illustrate plan and cross-sectional views, respectively, of an alternative embodiment in which a fiber experiences pressure points which are spaced aperiodically from each other to produce a broadened fiber polarizer, with the pressure points being located along ridges spaced aperiodically from each other;

DETAILED DESCRIPTION OF THE PREFERRED EMBODIMENT

Figure 1:
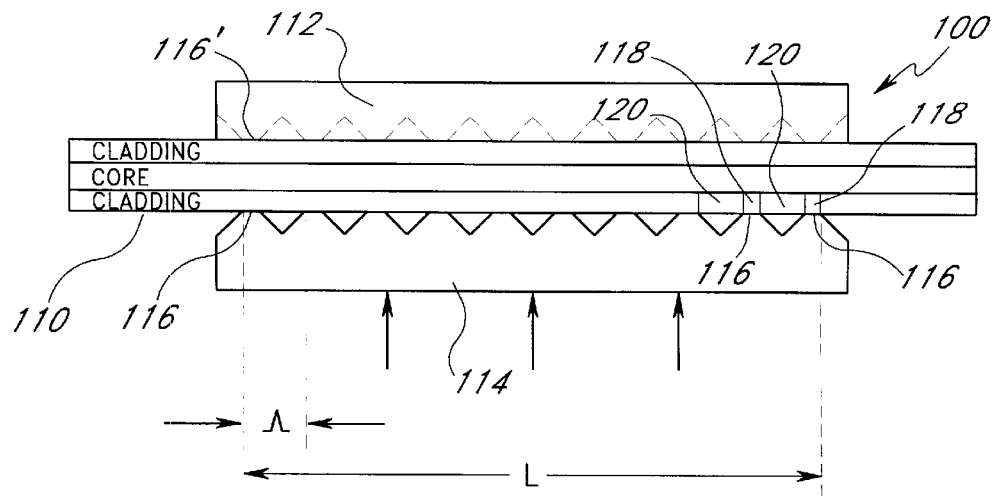
FIG. 1 illustrates a generalized embodiment of the invention in which pressure is applied periodically to a fiber to induce a periodic variation in the refractive index, thereby forming an optical grating.

The present invention is described below in connection with optical fibers, although it should be understood that other types of optical waveguides, e.g., integrated optical waveguides, can be advantageously substituted for the optical fibers in many of the embodiments described herein.

The basic principle of a filter 100 in accordance with the present invention will be explained first in connection with FIG. 1. Rather than using the photosensitive effect or arcing of the fiber, the filter 100 induces a periodic perturbation of the refractive index Δn of a fiber 110 by applying periodic pressure to the surface of the fiber 110. For example, the periodic pressure is applied by squeezing the fiber 110 between a first plate 112 and a second plate 114. A spring-loaded clamp (not shown) may be advantageously used to provide the pressure.

The second plate 114 has a plurality of ridges 116 formed thereon to form a ridged comb having a length L and a period Λ. Alternatively, both the first plate 112 and the second plate 114 may each have ridges therein, as shown by the ridges 116 shown in phantom in FIG. 1. The ridges 116 are advantageously formed by cutting grooves in the surface of a flat plate. Other techniques, such as chemical etching, ion etching, or micromachining, can also be used, in any number of materials such as metals, glasses, crystals, polymers, etc. For example, the grooves in a preferred embodiment have a depth of approximately 125 microns. The ridges 116 are pushed against the fiber 110 to produce a plurality of alternating stressed areas 118 and unstressed areas 120 in the fiber 110. The core and the cladding of the fiber 110 in the stressed areas 118 experience a change in refractive index, while the core and cladding in the unstressed areas 120 do not. This change in the refractive index is believed to be due at least in part to the photoelastic effect. Hence, a periodic grating is formed in the fiber 110. To act as a wavelength-dependent filter, the device 100 must (1) attenuate a particular subset of wavelengths, and (2) be highly transmissive at the remaining wavelengths. The period Λ of the stressed regions 118 must thus be such that at the first subset of wavelengths, the period is equal to the beat length between the $LP_{01}$ mode and a cladding mode of the fiber 110. Also, to meet the second condition at the remaining wavelengths, the fiber 110 must support no cladding modes to which the $LP_{01}$ mode can be coupled.

In the filter 100, the grating period is controlled by the period Λ of the ridged comb 114 along the longitudinal axis of the fiber 110. The proper period Λ depends on the propagation characteristics of the $LP_{01}$ and cladding modes of the fiber 110. The propagation characteristics depend on the core and cladding index profiles of the fiber 110. However, the period Λ can be as large as several hundred microns. This relatively large value for the period Λ makes it easy to fabricate such combs with standard machining equipment by forming grooves in a plate of metal or the like. The material remaining between the grooves forms the ridges 114. If a shorter period were required (i.e., to produce reflection gratings), the task would be more difficult, but possible, using, for example, micromachining or etching.

The foregoing can be understood mathematically as follows. As discussed above, the grooved plate 114 has a ridge periodicity Λ and is pressed against a length L of the fiber 110 to induce a periodic index change along the fiber 110 via the photoelastic effect. As discussed in V. Bhatia, et al., *Temperature-Insensitive and Strain-Insensitive Long-Period Grating Sensors for Smart Structures*, Optical Engineering, Vol. 36, No. 7, July 1997, pp. 1872–1876, when the spatial index in a photoinduced long-period fiber grating has a period in the right range (e.g., tens to hundreds of microns), there are distinct optical wavelengths $\lambda_m$ at which power traveling in the fundamental $LP_{01}$ mode of the core is coupled to forward-propagating cladding modes of order m. The coupling also occurs for like reasons for the mechanically induced long-period fiber grating of the present invention. The phase matching condition that must be met by wavelengths $\lambda_m$ can be written as:

$$\lambda_m = (n_{\mathit{eff}} - n_{cl}^m)\Lambda \tag{1}$$

where $n_{\mathit{eff}}$ is the effective index of the $LP_{01}$ core mode and $n_{cl}^m$ that of the $m^{th}$ cladding mode, both evaluated at wavelength $\lambda_m$. In general, for a particular period Λ, several cladding modes satisfy this condition, each one at a different center wavelength $\lambda_m$ that increases with the order of the mode. The filter transmission spectrum thus exhibits a series of transmission notches distributed over a spectral range of a few hundred nanometers. (See, for example, the spectra illustrated in A. M. Vengsarkar, et al., *Long-Period Fiber Gratings as Band-Rejection Filters,* cited above; and V. Bhatia, et al., *Temperature-Insensitive and Strain-Insensitive Long-Period Grating Sensors for Smart Structures,* cited above.). As implied by Equation 1, the positions of the transmission notches depend on the core and cladding index profiles, which determine $n_{eff}$ and $n_{cl}{}^m$, respectively. Because the difference $n_{eff}-n_{cl}{}^m$ is small when coupling to lower order cladding modes, the period Λ can be a large fraction of a millimeter, which can be conveniently achieved by mechanical means.

The spectral power transmission T(λ) of the filter notch arising from coupling to the $m^{th}$ cladding mode is given by the approximation developed in A. M. Vengsarkar, et al., *Long-Period Fiber Gratings as Band-Rejection Filters,* cited above:

$$T(\lambda) = 1 - \frac{\sin^2\left[\kappa_m L\sqrt{1+\left(\frac{\delta_m}{\kappa_m}\right)^2}\right]}{1+\left(\frac{\delta_m}{\kappa_m}\right)^2} \quad (2)$$

where $\delta_m$ is the detuning parameter $\delta_m=\pi[(n_{eff}-n_{cl}{}^m)/\lambda-1/\Lambda]$ and $\kappa_m$ is the grating coupling constant, in which both quantities are evaluated for mode m. The coupling constant $\kappa_m$ scales like the pressure-induced index change Δn, and it controls the depth of the notches.

Assuming complete transfer (i.e., $\kappa_m L=\pi/2$), an approximate expression for the full width half maximum (FWHM) $\Delta\lambda_m$ of a notch is:

$$\Delta\lambda_m = \frac{0.8\lambda_m^2}{L(n_{eff}-n_{cl}^m)} \quad (3)$$

Equation 3 shows that increasing the length over which the perturbation is applied results in narrower notch linewidths. For a filter designed to operate in a given wavelength range, e.g., $\lambda_m \approx 1.5-1.6$ microns, equation 3 shows that $\Delta\lambda_m$ is primarily determined by the product $L(n_{eff}-n_{cl}{}^m)$. In general, it is advantageous to design the filter such that the length of fiber L that is required is relatively short, e.g., $L\leq 5$ cm or approximately 2 inches. To accomplish this, equation 3 shows that it is advantageous to have a fiber designed such that the difference $(n_{eff}-n_{cl}{}^m)$ is as large as possible in practice. This in turn means that the fiber should have a guided mode $LP_{01}$ that is reasonably far from cutoff, which will guarantee that $n_{eff}$ is substantially larger than $n_{cl}{}^m$.

The filter 100 is substantially different both from the polarization coupler and the two-mode coupler discussed above. In the polarization coupler, coupling is caused by a periodic change in index, as in the present invention, but coupling occurs between polarization modes, not between the $LP_{01}$ mode and cladding modes. Thus, the wavelength dependence of the polarization coupler is substantially different than the wavelength dependence of the filter 100 of the present invention. Since the wavelength dependence is the property that produces the desired filter function, the coupling between the polarization modes would not likely produce the desired filter function. The same considerations apply to the two-mode coupler.

The pressure applied to the plate 114 controls the magnitude of Δn. Thus, the amount of power coupled per unit length and the attenuation of the filter are controlled in part by the pressure. The attenuation is also controlled by the length of the plate 114 under pressure. The length of the plate 114 also controls the linewidth of the attenuated wavelengths of the filter 100. The ridge sequence can also be constructed to be aperiodic to generate more complex filter functions, as discussed below.

In the filter 100, the filter function is effective as long as the pressure continues to be applied to the plate 114. The filter function disappears when the pressure is removed. The filter 100 can thus be applied and removed many times without damaging the fiber 110.

Figure 2A:
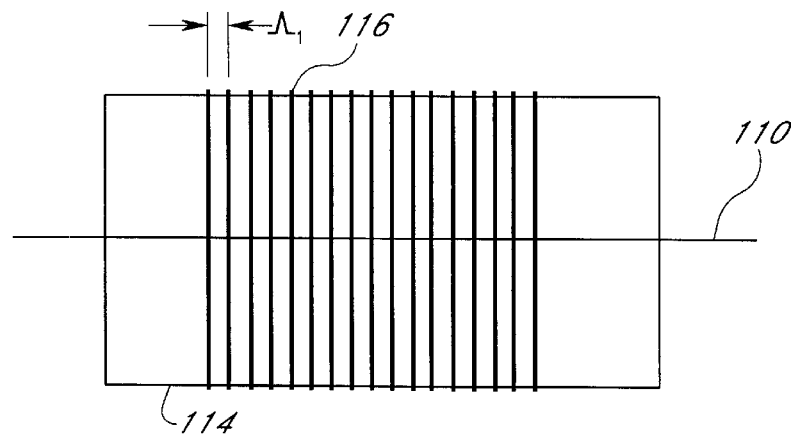
FIGS. 2A and 2B illustrate a fiber oriented perpendicularly and obliquely to a set of ridges, respectively, so that the spatial period between pressure points along the fiber is different.
Figure 2B:
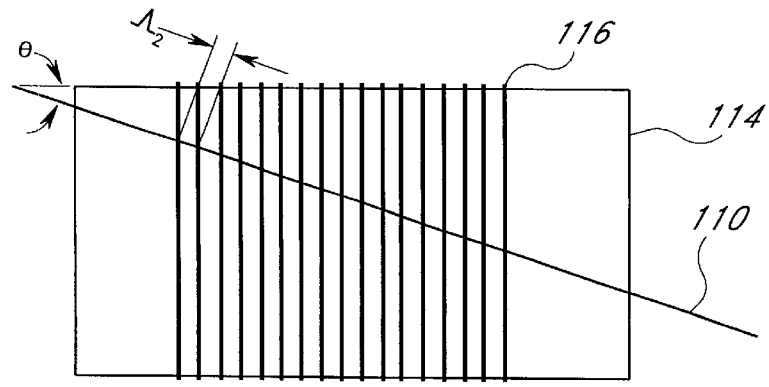

The filter function is also adjustable. One method of adjustment is to release the pressure, rotate the plate 114 by a selected angle about its mid-point, and press the plate 114 against the fiber 110 again. The fiber 110 then sees a different (longer) period equal to the comb period Λ divided by the cosine of the angle by which the plate 114 was rotated. This is illustrated in FIG. 2A, which illustrates the fiber 110 oriented perpendicular to the ridges 116 corresponding to for a first period $\Lambda_1=\Lambda$ and in FIG. 2B, which illustrates the fiber 110 oriented at a different angle to the ridges 114 to provide a second period $\Lambda_2=\Lambda/\cos\theta$ along the length of the fiber 110. As illustrated, the period $\Lambda_2$ is longer than the period $\Lambda_1$.

FIG. 3A illustrates an experimental system 200 in which broadband optical radiation such as white light from a source 310 is applied to the device 100 of FIG. 1. For the purpose of the experiment, the light first propagates through a filter 100 constructed in accordance with the filter 100 of FIG. 1. After propagating through the filter 100, the light is output to an optical spectrum analyzer 240. In one particular embodiment, the optical fiber 110 is a Corning SMF-28 CPC single-mode fiber having a core diameter of 8.3 microns, a cladding diameter of 125 microns, and a core refractive index difference of 0.3%. (Although the fibers herein may advantageously be single-mode fibers, they may alternatively be close to single-mode at the wavelengths of the signals, such that the fibers each carry at most a few modes.)

FIG. 3B illustrates an experimental system 202 in which a polarized laser source 311 is applied to the device 100 of FIG. 1. The light first propagates through a polarization controller 314 and then through a filter 100 constructed in accordance with the filter 100 of FIG. 1, before it is output to an optical spectrum analyzer 240. All of the experimental data presented herein were obtained with the experimental setup of FIG. 3A, except for the data of FIG. 13 which were obtained with the setup of FIG. 3B.

Figure 4:
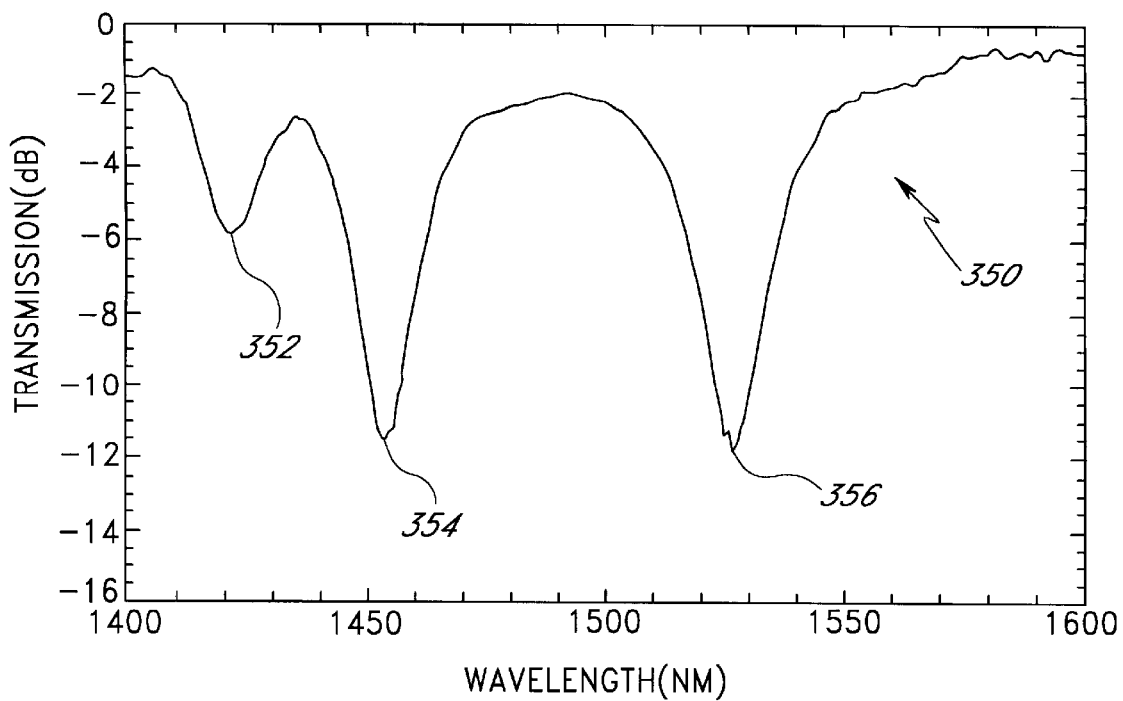
FIG. 4 illustrates an experimentally determined transmission spectrum obtained with a mechanical grating filter.

FIG. 4 illustrates an exemplary transmission spectrum 350 of the mechanical grating filter 100, measured with the setup of FIG. 3A, when Λ is selected to be 580 microns and pressure is applied over a length L of 2.5 centimeters. As illustrated for light in the range of 1,400 to 1,600 nanometers, the transmission spectrum 350 includes three transmission notches 352, 354, 356 at approximately 1,420 nanometers, 1,455 nanometers and 1,525 nanometers, respectively, which correspond to coupling from the core to one of the first three cladding modes.

Figure 5:
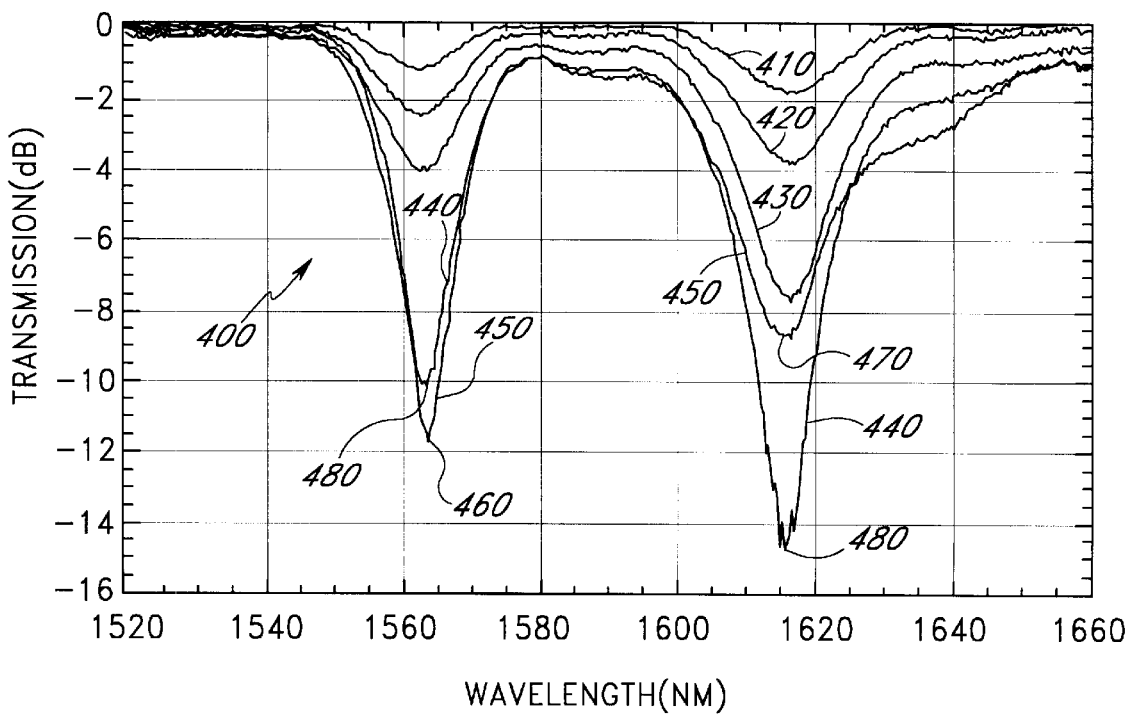
FIG. 5 illustrates a series of experimentally determined transmission spectra obtained with a mechanical grating filter in which increasing pressure is applied to the filter.

FIG. 5 illustrates an exemplary transmission spectrum 400 of the filter 100 for a period Λ of 712 microns and for light in the range of 1,520 nanometers to 1,660 nanometers, again measured with the setup of FIG. 3A. The period of 712 microns is advantageously obtained by positioning the fiber 110 at an angle with respect to the plate 114 of FIG. 1 to increase the period. FIG. 5 includes a plurality of curves 410, 420, 430, 440, 450, which represent measurements for different increasing pressures applied to the filter 100. The first curve 410 illustrates relatively low attenuation resulting from relatively low pressure applied to the filter 100. The second curve 420, the third curve 430, the fourth curve 440 and the fifth curve 450 illustrate the results of increasing the pressure applied to the filter 100.

From the curve 420 to the curve 440, the increasing pressure results in larger coupling constants $\kappa_m$ and deeper notches. For this grating length and for this range of pressure, the increasing pressure increases the amount of optical power coupled from the core mode to the cladding mode and thus the amount of power lost from the core of the fiber 110. However, if the applied pressure is increased beyond a certain point, one expects that the notch depth will reach a maximum, then decrease. This behavior is supported by Equation 2 over certain ranges of grating length L and coupling constant $\kappa_m$. This is what is observed in FIG. 5 for the leftmost notch (at 1565 nm): When the pressure is increased from the curve 440 to the curve 450, the attenuation of that notch decreases, while the attenuation of the rightmost notch (at 1615 nm), which has not reached its maximum, continues to increase. This effect can be used as a method in which the relative magnitude (i.e., strength) of attenuation peaks (transmission notches) can be changed by varying the applied pressure.

As illustrated in FIG. 5, the transmission spectrum 400 includes two distinct transmission notches (i.e., attenuation peaks) for each of the curves 410, 420, 430, 440, 450. The leftmost peak (shorter wavelength) of each curve (e.g., a peak 460 for the curve 450) at approximately 1,565 nanometers represents the coupling of light from the core to the lowest order cladding mode. The rightmost peak (longer wavelength) of each curve (e.g., a peak 470 for the curve 450) at approximately 1,615 nanometers represents the coupling of light from the core to the next order symmetric cladding mode. Note that attenuation in excess of 14 dB (transmission less than −14 dB) can be obtained. For all cases, the out-of-band attenuation, for example, at 1,540 nanometers, is less than 0.5 dB. Thus, the residual loss in the fiber 100 is very low. It has been found that the residual attenuation loss can be maintained at a lower value than shown in FIG. 5 by keeping the fiber under slight tension before clamping it between the plate 112 and the plate 114 (a step which was not taken when measuring FIG. 5). It is believed that this causes stiffening of the fiber 110, which reduces the microbending.

Figure 6:
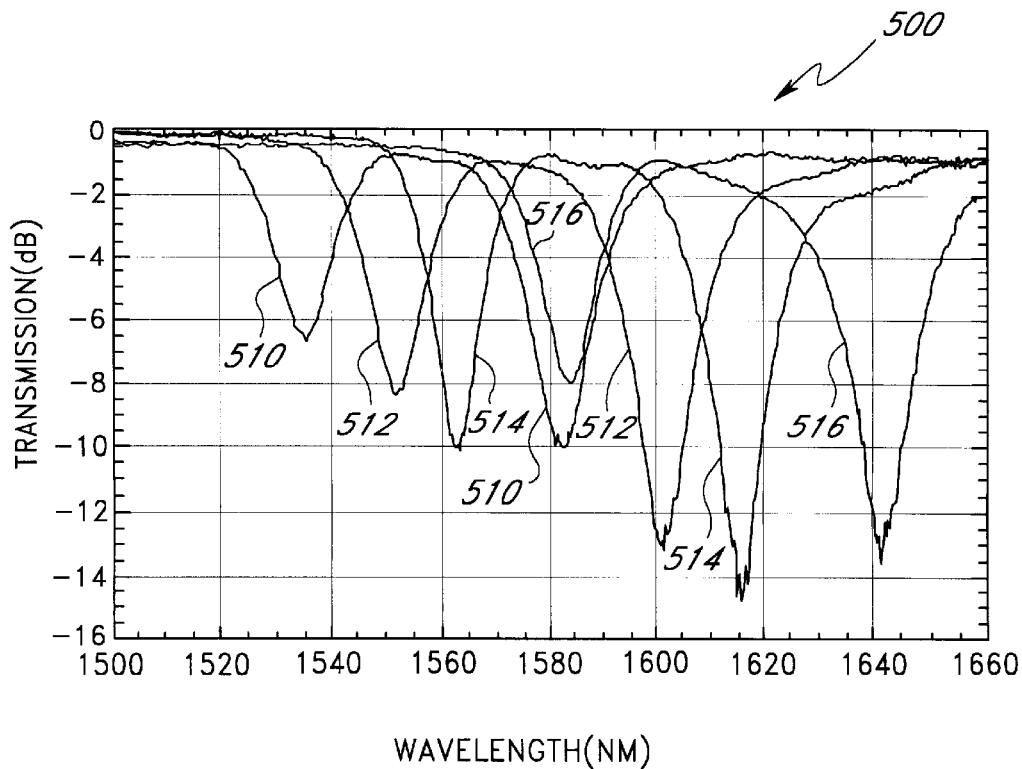
FIG. 6 illustrates a series of experimentally determined transmission spectra for which the period of the pressure grating was varied, which shifted the transmission spectra.

The filter 100 illustrated in FIGS. 1–3A,B has three parameters which can be adjusted independently, and each of the adjustable parameters affects a respective different parameter of the filter spectrum illustrated in FIG. 5. The first adjustable parameter is the period Λ, which can be used to adjust the locations of the peaks (e.g., peaks 460, 470 of the filter spectrum 400). The parameter Λ can be adjusted by varying the period of the ridges 116 in the plate 114 or by adjusting the orientation of the fiber 110 with respect to the ridges, as illustrated in FIGS. 2A and 2B. The effects of adjusting the period of the ridges 116 is illustrated by the set of curves 500 in FIG. 6, which represents the transmission spectra for gratings having periods ranging from 683 microns to 722 microns and having a length of approximately 2.5 centimeters. A first curve 510 represents the filter function for a grating having a period of 683 microns. A second curve 512 represents the filter function for a grating having a period of 703 microns. A third curve 514 represents the filter function for a grating having a period of 712 microns. A fourth curve 516 represents the filter function for a grating having a period of 722 microns. As illustrated, a longer grating period shifts the attenuation peaks towards longer optical wavelengths. For example, the leftmost (lower wavelength) peak for the 683-micron grating occurs at approximately 1,535 nanometers. In contrast, the leftmost peak for the 722-micron grating occurs at approximately 1,585 nanometers. By comparing the location of the leftmost lobes of FIG. 4 for a grating period of approximately 580 microns and the location of the leftmost lobe of FIG. 5 for a grating period of 722 microns, it can be seen that the attenuation can be tuned over a range of at least 165 nanometers, from approximately 1,420 nanometers to approximately 1,585 nanometers. (Larger ranges are possible by further increasing the angle between the fiber and the grating.)

Figure 7:
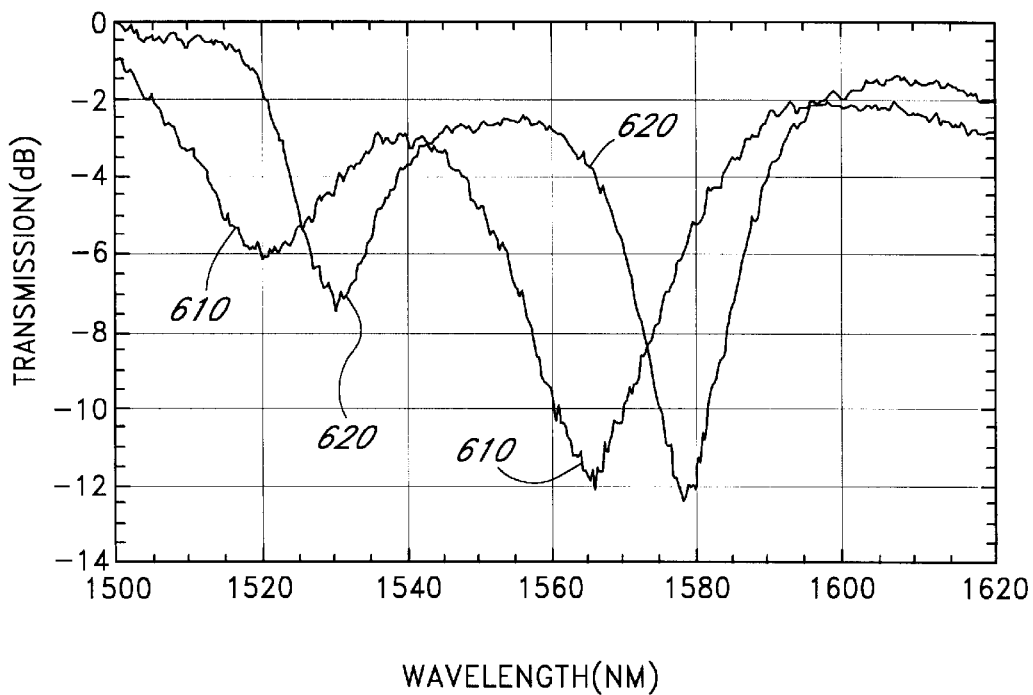
FIG. 7 illustrates two transmission spectra for which the length of the grating fiber over which pressure is applied was different, which changed the linewidth of the transmission notches.
Figure 8:
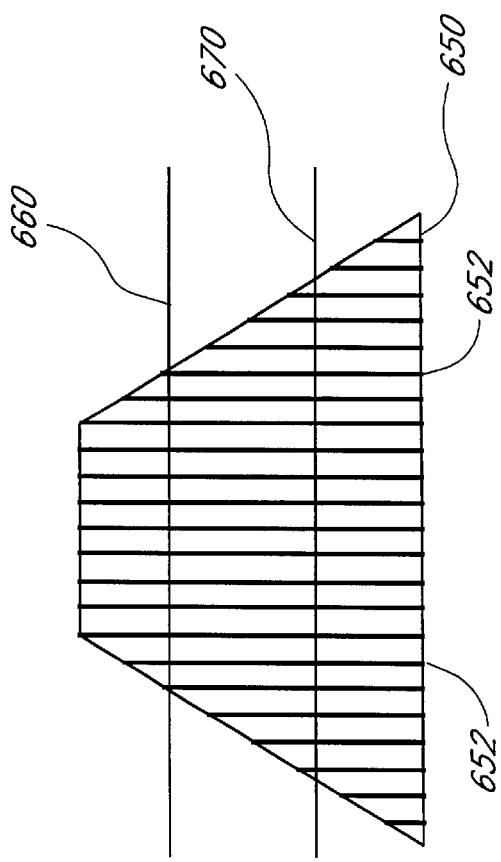
FIG. 8 illustrates a grooved, wedge-shaped plate in which the grating length can be varied by varying the position of the fiber.

The second adjustable parameter is the length of the region under pressure. By adjusting the length of the region under pressure, the widths of the peaks of the filter function can be adjusted, as predicted by Equation 3. The effect of the length of the squeezed region on the linewidth of the filter function is illustrated in FIG. 7 for two different lengths. A first curve 610 represents the filter function for a grating having a length of 1.9 centimeters. A second curve 620 represents the filter function for a grating having a length of 2.5 centimeters. Note that the linewidths of the transmission notches (attenuation peaks) for the curve 610 are wider than the linewidths of the transmission notches for the curve 620. The linewidths of the transmission notches (defined as the fill width at half maximum (FWHM)) are approximately proportional to the inverse of the respective fiber grating length. Experimentally, the linewidths have been observed to be in the range of 5–25 nanometers. In an experimental setup, the grating length can be varied by providing a wedge-shaped plate 650 having parallel rows of grooves 652 therein (which define rows of ridges between the grooves for contacting a fiber), as illustrated in FIG. 8. By positioning the fiber in different locations on the plate 650, the grating length can be varied without changing the periodicity of the pressure points experienced by the fiber. For example, a first fiber position 660 and a second fiber position 670 are illustrated in FIG. 8. Once again, a top plate (not shown) can be used for compressing the fiber onto the plate 650.

The third adjustable parameter is the amount of pressure applied to the plate. The amount of pressure controls the depths of the transmission notches, as was discussed above in connection with FIG. 5. As illustrated, although the depths of the perturbation notches generally increase with increasing pressure (up to some pressure), the shapes of the notches remain substantially the same. In particular, the notches can be described as a sinc² function (i.e., a $(\sin x/x)^2$ function).

All results presented so far involved an unpolarized (white light) source. However, in the form described so far, the filter function provided by the filter 100 is polarization dependent because the index change is different in the direction of the applied pressure from the direction orthogonal to it. To test the polarization dependence of a mechanically induced long-period fiber grating, a polarized tunable laser was used as a light source. The polarization controller 314 (see FIG. 3B) was placed between the source and the long-period fiber grating filter. The polarization of the input signal was changed with the polarization controller 314 until the filter produced a minimum transmission. The polarization was again adjusted until the filter produced a maximum transmission. These measurements were then repeated for a series of wavelengths across the filter transmission notch.

Figure 13:
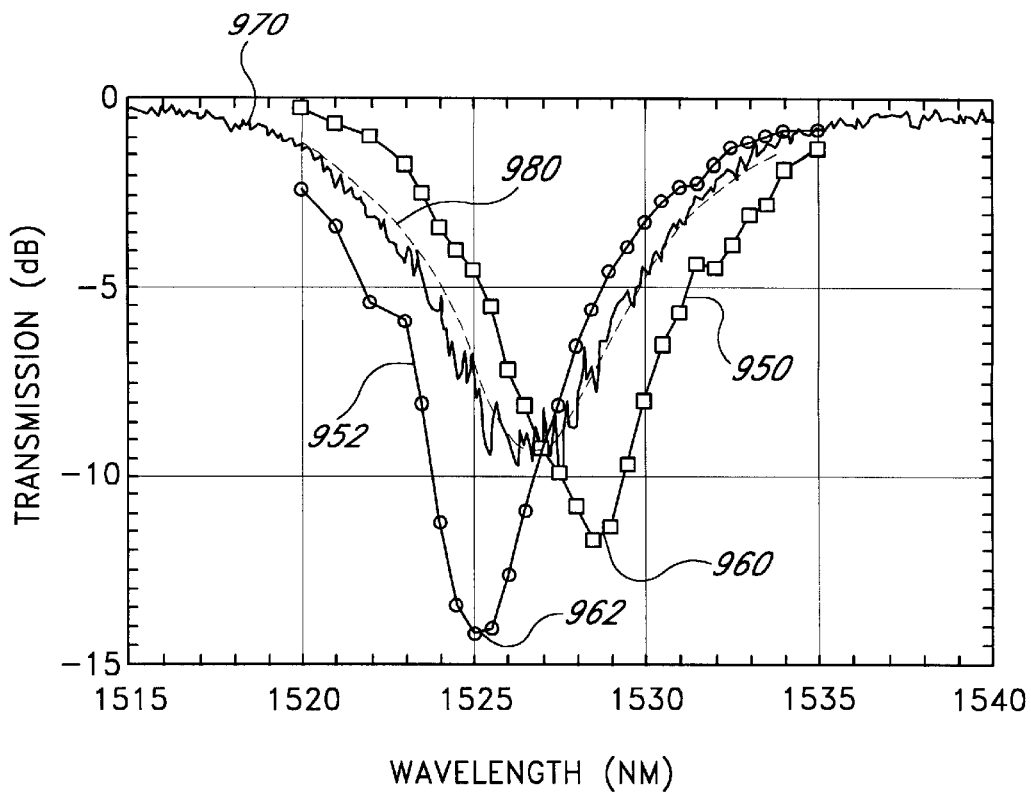
FIG. 13 is a measurement illustrating how attenuation through a fiber grating is a function of polarization.

The results of the foregoing measurements are plotted in FIG. 13 as a first spectrum 950 for a first polarization and a second spectrum 952 for a second polarization. The spectra 950, 952 show significant polarization dependence. The attenuation peak 960 for the first spectrum 950 occurs at a wavelength that is approximately 4 nanometers from the attenuation peak 962 for the second spectrum is 952. The peak attenuations 960, 962 differ by approximately 2.3 dB. FIG. 13 also illustrates an unpolarized filter spectrum 970, measured with the same filter but with an unpolarized white light source, and also illustrates an average 980 of the two polarized spectra (dotted line), which agrees well with the unpolarized filter spectrum.

This polarization dependence can be beneficial in several applications, as discussed below. For example, the polarization dependence may be used to produce a polarizer. On the other hand, polarization dependence may be undesirable in other applications such as, for example, gain flattening. The polarization can be greatly reduced by a number of methods.

Figure 9:
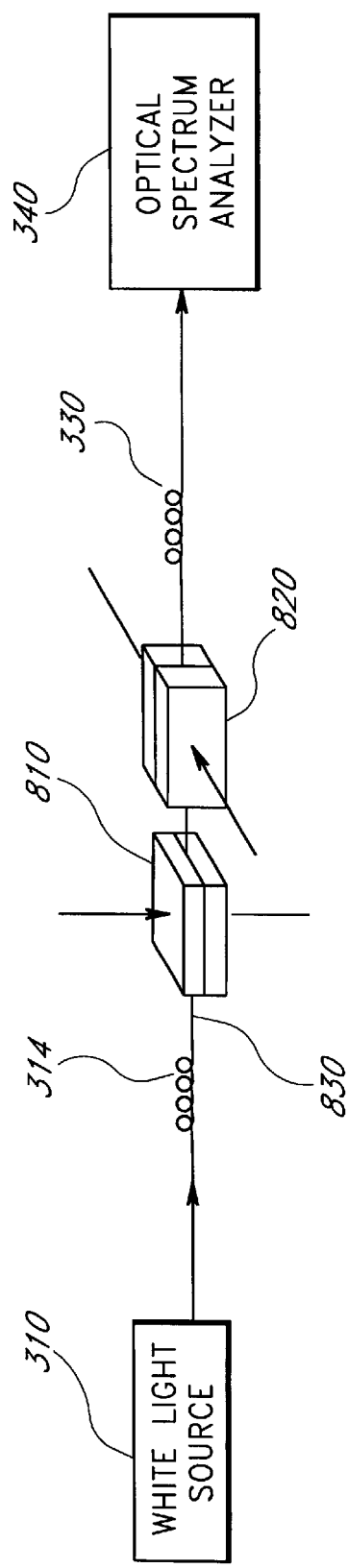
FIG. 9 illustrates a system for producing substantially polarization independent attenuation, in which two filters apply pressure to a grating fiber at 90° to each other.

A first method of obtaining substantially polarization independent operation is illustrated in FIG. 9, which is similar to FIG. 3A described above. Two polarization controllers 314 and 330 are used, and two filters 810, 820 are positioned on the same (low-birefringent or high-birefringent) fiber 830, one after the other and fairly close to each other. The pressure applied to the fiber 830 by the second filter 820 is oriented at 90° with respect to the pressure applied by the first filter 810, thus effectively causing equal pressure to be applied to each of the polarization axes of the fiber 830.

Figure 10:
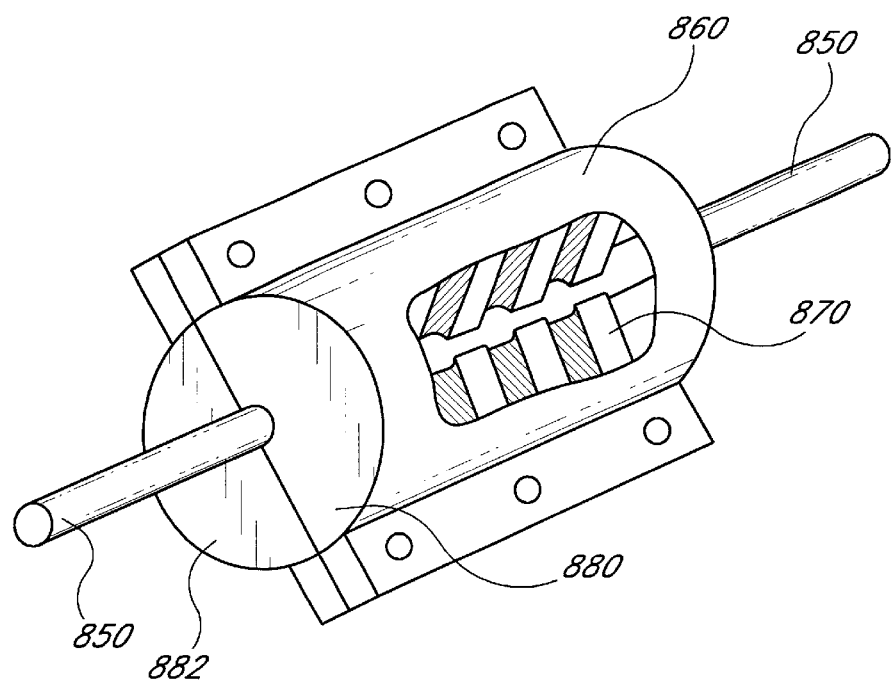
FIG. 10 illustrates a system for producing polarization independent operation in which pressure is applied to a grating fiber with radial symmetry.

A second method of reducing the polarization dependence is to apply the pressure to a fiber 850 with a cylinder 860, as illustrated in FIG. 10. The cylinder 860 has ridges 870 on its inner surface. The inner diameter (ridge crest to ridge crest) defined by the curved end surfaces of the ridges 870 is slightly smaller than the outer diameter of the fiber 850 (see cutaway portion of FIG. 10). The inner ridges 870 have the same period as described earlier. The cylinder 860 is divided lengthwise in two halves 880, 882, as shown in FIG. 10. The two halves 880, 882 are clamped together by known mechanical clamping devices so that the two halves 880, 882 apply radially symmetric pressure to the fiber 850. The index change is then polarization independent.

Figure 11:
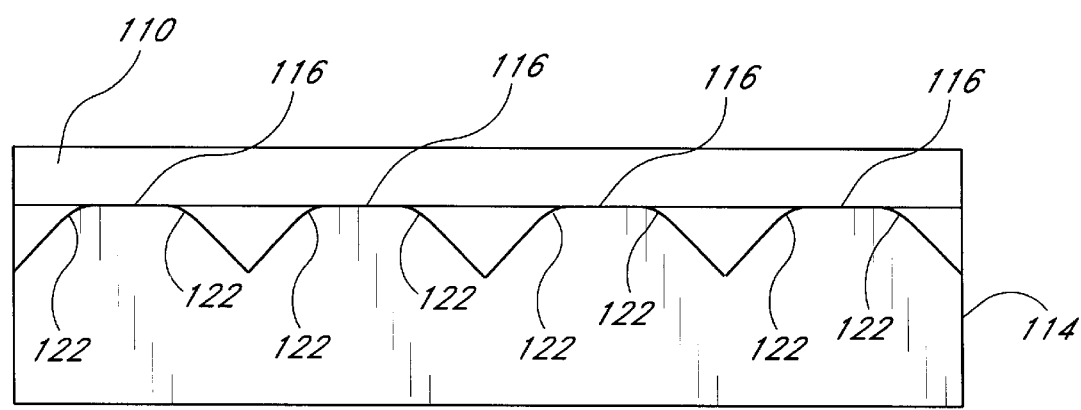
FIG. 11 illustrates an exemplary cross section of the embodiment of FIG. 1 showing that the ridges which make contact with the fiber are generally flat to avoid microbends in the fiber.

In any of the embodiments described thus far, it is advantageous to avoid inducing microbends in the fiber where the corners of the ridges contact the fiber. Such microbends induce losses at all wavelengths. To avoid the microbends, the corners of the ridges should not be too sharp. Sharp corners can be avoided by one of many techniques, including mechanical abrasion, polishing, etching, ion milling, etc., depending on the material used. FIG. 11 illustrates an exemplary cross section of the second plate 114 of FIG. 1. As illustrated, the ridges 116 between the grooves have generally flat tops to enhance the contact with the fiber 110 and to reduce microbending of the fiber. Also, the ridges 116 have rounded corners 122 which increase the radius of curvature of the fiber 110 at the corners, compared to what the radius of curvature of the fiber would be at the corners if they were not rounded. This helps avoid microbends in the fiber 110, and thus reduces optical losses within the fiber.

Figure 12A:
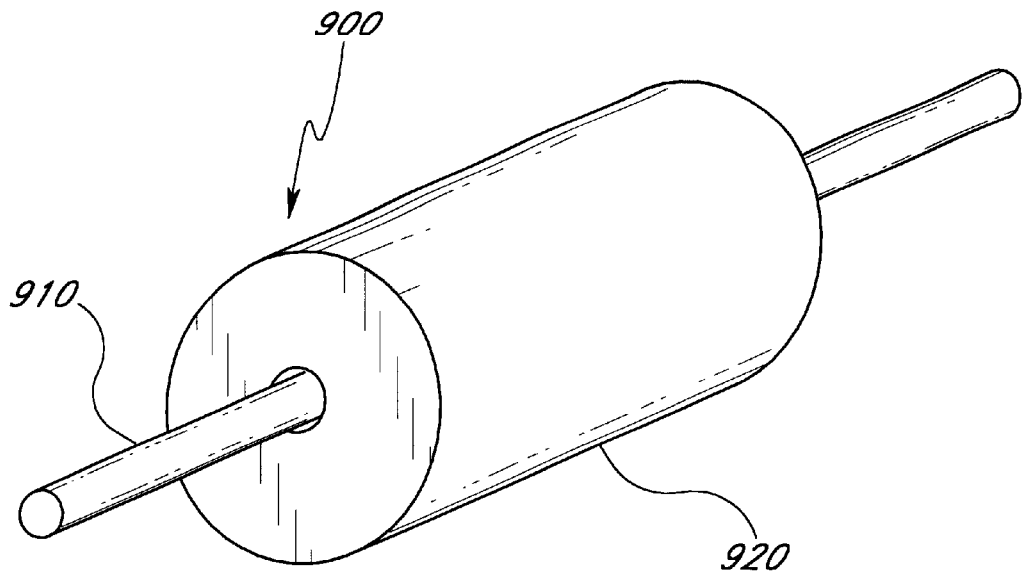
FIGS. 12A and 12B illustrate another radially symmetric filter embodiment similar to that of FIG. 10.
Figure 12B:
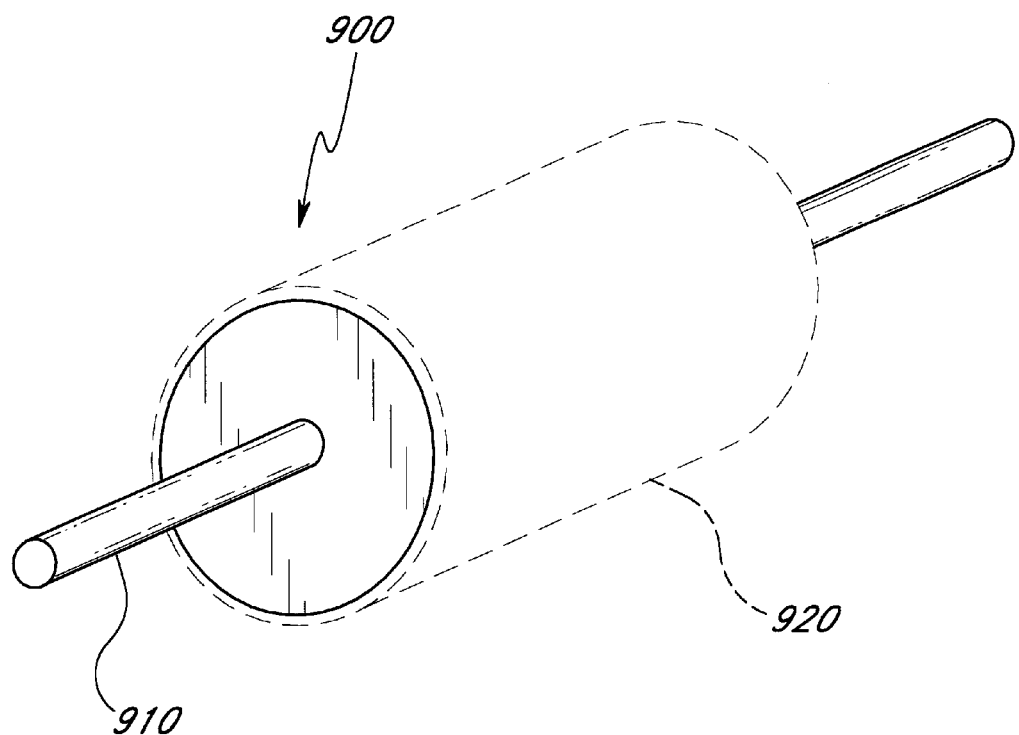

As stated above, the filter function persists only as long as the pressure is on. As illustrated in FIGS. 12A and 12B, a permanent filter 900 can be advantageously formed on a fiber 910 by using a cylinder 920 having internal ridges such as ridges 870 in FIG. 10. However, in FIGS. 12A and 12B, the cylinder 920 is not split in two halves. Rather, the cylinder 920 is a single-piece filter. The inner diameter of the cylinder 920 is again selected to be slightly smaller than the outer diameter of the fiber 910. The cylinder 920 advantageously comprises a material with a high thermal expansion coefficient compared to silica. For example, the cylinder 920 may be fabricated from a metal. The cylinder 920 is first heated to cause the cylinder 920 to expand, thereby causing its inner diameter to become larger than the outer diameter of the fiber 910. Thus, the fiber 910 can be slipped through the cylinder 920 between the ridges, as illustrated in FIG. 12A. Upon cooling, the cylinder 920 shrinks around the fiber 910 and becomes effectively sealed against the fiber 910, thus applying a constant pressure to the fiber 910, as illustrated in FIG. 12B. This approach may prohibit the use of a fiber jacket with a low melting point, but can be used with fiber coatings such as amorphous carbon or metals.

In the alternative, rather than heating the cylinder 920, the fiber 910 is cooled to a cryogenic temperature so that the fiber 910 shrinks to a sufficiently small diameter that it may be readily slipped into the cylinder 920. Then, as the fiber 910 returns to ambient temperature, the fiber 910 expands so the inner ridges of the cylinder 920 apply pressure to the fiber 910. This method would not jeopardize the mechanical integrity of the fiber jacket.

As a further alternative, a combination of heating the cylinder 920 and shrinking the fiber 910 may advantageously be used. Such methods are commonly used in mechanical engineering to lock metal parts together. Regardless of which of the three methods is used, the maximum or minimum temperature of the fiber 910 must be sufficiently modest to avoid physical damage or breaking of the fiber 910 or alteration of the properties of the fiber core, such as by dopant diffusion or the like.

A possible difficulty is that the pressure applied by the plate or cylinder to the fiber is likely to be affected by the external temperature, because the two materials expand at different rates. Thus, as the external temperature varies, the fiber and the stress member expand differently, the applied stress varies, and the filter function changes. This effect is slow but is undesirable in general. The effect may be reduced in the above-described permanent fixture (i.e., in the embodiment utilizing the cylinder). Another way to reduce variation in applied stress is to utilize a stress member comprising a material having a thermal expansion coefficient matched to that of the fiber.

An alternative implementation of the present invention involves lightly melting or softening the fiber on a spatially periodic pattern (instead of stressing it externally). The heat is expected (1) to cause some compaction of the fiber, and (2) to induce permanent stresses in the heated regions. Both effects are known to induce changes in the local refractive index. Two methods may be used to induce a permanent thermal index grating. In the first method, a segment of fiber is exposed to the focused beam of a laser with a wavelength that is absorbed by the fiber material, e.g., a 10.6-micron $CO_2$ laser for a silica-based fiber. The laser beam is focused to the right diameter (roughly half a period of the final grating). The heat deposited by the laser must not migrate (via conduction) too far into the rest of the fiber on either side of the laser-irradiated segment (otherwise these areas will melt or soften too). To this end, the laser is pulsed, and the pulses are sufficiently short that during a given pulse the heat deposited in the fiber does not have time to be conducted into the surroundings. The time it takes heat to diffuse out of the fiber is typically on the order of hundreds of milliseconds to seconds, so that a laser delivering sub-millisecond pulses may be advantageously used. After the delivery of a pulse, heat diffuses along the fiber on both sides of the exposed region so that the region perturbed by the heat is longer than the laser beam diameter. This effect can be corrected by using a beam diameter narrower than a half period by a prescribed amount. The prescribed amount is determined by modeling or is determined empirically. A grating is formed by displacing either the laser or the fiber (or by displacing both) by half a period and repeating this process until the desired length has been processed. Other configurations are possible. For example, as is done with photosensitive fiber gratings, the fiber can be exposed to a laser interference pattern with the correct period corresponding to the desired grating. The interference pattern can be produced advantageously by interfering two laser beams split from the same laser so as to generate a spatially modulated pattern with the required period. The desired pattern can also be produced with a phase mask of suitable period.

In a further implementation of the present invention, the fiber core (or a larger transverse section of the fiber) contains a dopant that absorbs strongly over a wavelength range away from the signal wavelength window. For example, the dopant absorbs only below 700 nanometers, so that a signal at 1.3 or 1.55 microns propagates through the fiber without dopant-induced loss. The grating is formed by exposing the fiber to a laser having a wavelength which is absorbed by the dopant. The laser is applied either point by point or with an interference pattern, as described above. The laser is pulsed. If only the core is doped, the pulses must be shorter than the time it takes heat to be conducted out of the core, which is typically approximately 5–25 microseconds, depending on the fiber core size. If a transverse region larger than the core is doped and exposed to laser light, the pulses need to be shorter than the time it takes heat to be conducted out of that region. The conduction time is longer than approximately 5–25 microseconds, depending on the transverse size of the exposed region. Thus, the pulses need to be shorter than this conduction time. The described method offers the benefit of possibly using a wider range of lasers by proper selection of the dopant or dopant combinations.

In photoinduced long-period fiber gratings, the transmission function is affected by external temperature variations mainly through the temperature dependence of the difference between the effective index of the $LP_{01}$ and that of the cladding mode. Similar effects are expected in a mechanically induced long-period fiber grating in accordance with the present invention. A smaller contribution is also expected from variations in the period $\Lambda$ via thermal expansion of the grooved plate 114. These mechanisms lead to a temperature dependence of the peak wavelength.

The peak of attenuation of the notches may also depend on temperature, in particular via the temperature dependence of the pressure exerted by the springs or other mechanism used to apply pressure to the plate 114 and thus to the fiber 110. For example, as shown in FIG. 1, pressure on the fiber 110 is applied and maintained by a vice-like device in which, e.g., a number of spring-loaded screws (not shown) pass through the top (e.g., flat) plate 112 and into the grooved plate 114, with the fiber 110 being sandwiched between these plates. As the temperature varies, the amount of pressure experienced by the fiber 110 varies as the device or a portion of the device (e.g., the spring-loaded screws) expand and contract. The variations with temperature of the transmission spectrum of a mechanically induced long-period fiber grating with a 640-micron period were measured by placing the entire mechanical fixture of FIG. 1 in a water bath and slowly changing the temperature of the bath by approximately 60° C. These tests were run with two types of pressure plate 114, namely a stainless steel pressure plate and a plate of fused silica (which has a much lower thermal expansion coefficient than stainless steel) with grooves machined into the silica. The results are summarized in Table 1. For both materials, the thermal variations in the peak wavelength are small and are around 0.05 nanometers per ° C. This thermal variation is comparable to the values reported for other types of long-period fiber grating filters around 1.55 μm, including photoinduced gratings. (See Table 1, and also see A. M. Vengsarkar, et al., *Long-Period Fiber Gratings as Band-Rejection Filters,* cited above.) The thermal variations are also comparable to variations in gratings fabricated by residual stress relaxation (0.037–0.070 nanometers per ° C.), as described, for example, in T. Enomono, et al., *Long-Period Fiber Grating in a Pure-Silica-Core Fiber Written by Residual Stress Relaxation, Proceedings of Optical Communication Conference OFC'98,* 1998 OSA Technical Digest Series Vol. 2, February 1998, pp. 277–278. With either the stainless steel plate or the glass plate, the thermal variations in the peak attenuation are around 0.04 dB/° C. (see Table 1), which is relatively small but larger than for a photoinduced long-period fiber grating by a factor of approximately 4.

To verify that this larger dependence is due primarily to the temperature dependence of the pressure applied by the springs, tests were conducted with a temperature-independent pressure source. Specifically, a weight was placed on the plate 112 instead of using springs between the plates 112 and 114. Table 1 shows that the peak attenuation variation with temperature is then considerably lower, around 0.007 dB/° C. This is slightly better than reported in photoinduced long-period fiber gratings. Thus, the temperature dependence of the peak attenuation observed in the spring-loaded filters is mostly due to the temperature dependence of the spring coefficient. With a suitable, constant-force design, the dependence due to the spring coefficient can be largely eliminated, thereby making the temperature sensitivity of mechanically induced long-period fiber gratings as low as photoinduced long-period fiber gratings (LPFGs).

TABLE 1

| Filter type | Peak wavelength | Peak wavelength shift | Peak attenuation variation |
| --- | --- | --- | --- |
| Glass grooves (spring) | 1530 nm | 0.048 nm/° C. | 0.032 dB/° C. |
| Metal grooves (spring) | 1555 nm | 0.058 nm/° C. | 0.048 dB/° C. |
| Metal grooves (weight) | 1550 nm | 0.047 nm/° C. | 0.007 dB/° C. |
| Photoinduced | 1550 nm | 0.04–0.05 nm/° C. | 0.01 dB/° C. |

Measured temperature dependence of the peak wavelength and peak attenuation of a mechanically induced LPFG and comparison to photoinduced LPFG.

The main reason for the temperature sensitivity of long-period fiber gratings is that the core mode and the cladding mode (to which the core mode is coupled) both have mode indices that exhibit different temperature dependencies. Thus, in Equation 1, the mean wavelength of the filter notches, which is proportional to the difference between these two indices, varies with temperature. As described in U.S. Pat. No. 5,703,978 to DiGiovanni et al., "Temperature insensitive long-period fiber grating devices," which is hereby incorporated by reference herein, one can reduce this dependence dramatically by selecting an index profile for the cladding such that the cladding modes and the core mode have substantially identical effective index temperature dependence. This can be accomplished by using a composite cladding made of layers of different materials with different refractive index thermal coefficients dn/dT, such that the average index seen by the cladding modes gives the cladding modes the right mode index dependence with temperature. Suitable materials include silica-based glass doped with various concentrations of phosphorus, fluorine, germanium, or other dopants. Thus, by appropriate selection of the cladding's index profile, the various embodiments of this invention can be made substantially temperature insensitive.

Figure 14:
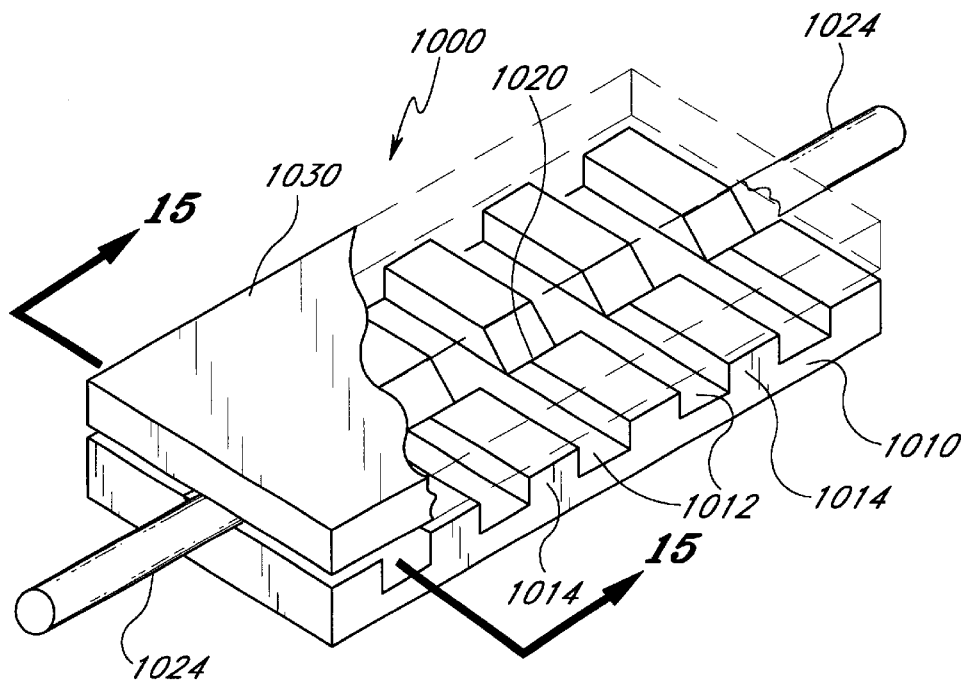
FIGS. 14 and 15 illustrate perspective and cross-sectional views, respectively, of an embodiment for reducing the polarization dependence of a fiber's attenuation, in which the fiber resides within a V-shaped groove.
Figure 15:
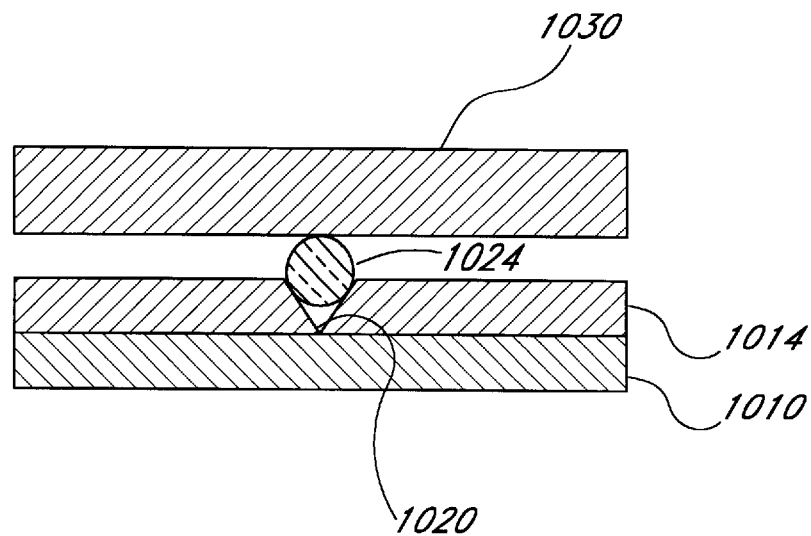

FIGS. 14 and 15 illustrate a further system 1000 for reducing polarization dependence. In particular, as illustrated in FIG. 14, a lower plate 1010 has a plurality of grooves 1012 formed on a first surface to provide a plurality of alternating ridges 1014 between the grooves. The ridges 1014 have a periodicity of Λ. Unlike the previously described embodiments, the ridged plate 1010 has a generally V-shaped groove 1020 formed in the ridges 1014 and oriented substantially perpendicular to the ridges 1014. An optical fiber 1024 is positioned in the groove 1020 so that the optical fiber 1024 is also oriented substantially perpendicular to the ridges 1014. An upper plate 1030 presses down on the optical fiber 1024, as described above. In the embodiment illustrated in FIGS. 14 and 15, the circumference of the fiber 1024 engages the surfaces of ridges 1014 formed by the groove 1020. Thus, rather than the fiber 1024 contacting the ridges 1014 at locations diametrically opposed to the contact with the upper plate 1030, the fiber 1024 contacts each ridge 1014 at two locations. Each contact surface of each of the ridges 1014 applies pressure to the fiber 1024 and has a vertical vector component (which opposes the pressure of the upper plate 1030 in the vertical direction) and a horizontal vector component (which applies pressure to the fiber 1024 in a horizontal direction orthogonal to the applied pressure from the upper plate 1030). Thus, in the embodiment of FIGS. 14 and 15, pressure is applied to the fiber 1024 symmetrically, so that the indices of refraction of the fiber 1024 are changed by similar or identical amounts, which reduces or eliminates the polarization dependence.

The angle of the groove 1020 that yields equal forces in the parallel and perpendicular directions is 60°, as shown in FIG. 15, corresponding to the fiber 1024 being pressed at three points located at 120° from each other around the perimeter of the fiber. Although this is not truly azimuthally symmetric, calculations for a more general configuration in which pressure is applied to the fiber 1024 at p points symmetrically located around the fiber perimeter (e.g., every 120° for p=3, every 90° for p=4, etc.) show that for p≧3, the pressure at the center of the fiber will be symmetric, i.e., purely radial, and the filter should be fairly independent of polarization. However, these calculations assume that the pressure is applied along the entire length of the fiber 1024, i.e., they ignore the fact that the pressure is applied periodically. Nevertheless, the conclusion should still apply in the case of periodically applied pressure. Thus, to reduce or remove the polarization sensitivity of the filter, pressure is preferably applied symmetrically. For example, a 60° groove pushed against a flat plate will work (as shown schematically in FIGS. 14 and 15), as will a 90° groove pushed against another 90° groove (see FIGS. 16 and 17).

Figure 16:
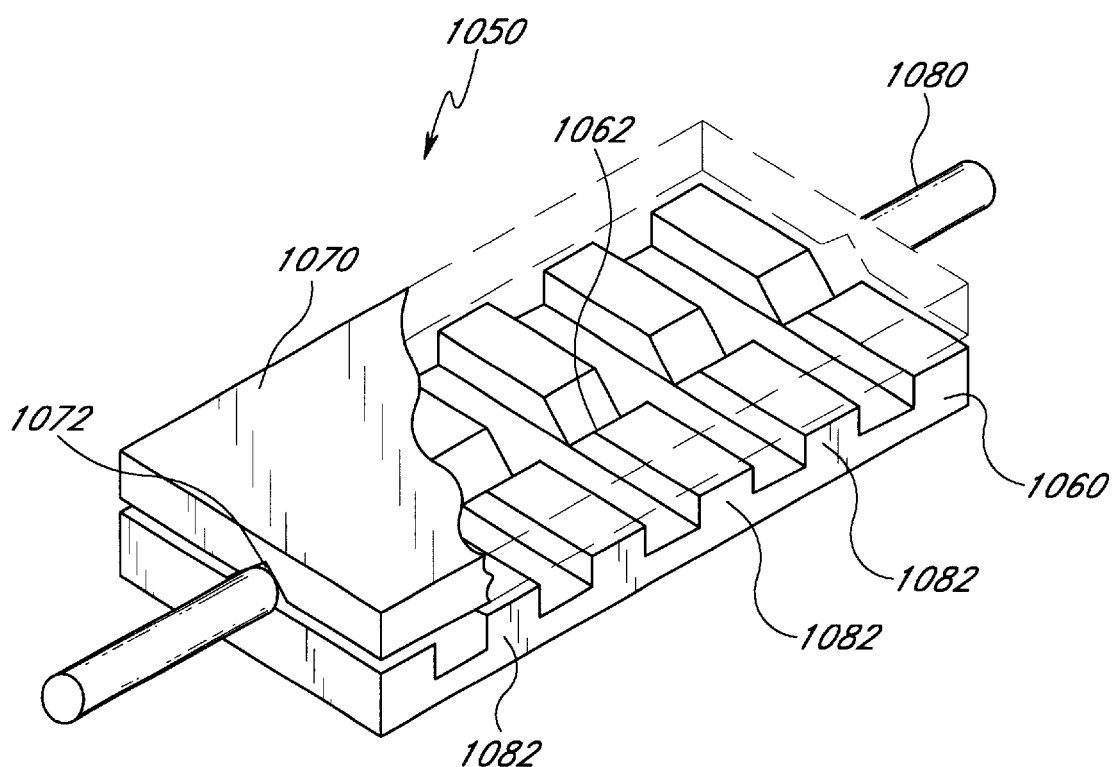

FIGS. 16 and 17 illustrate a further system 1050 in which a ridged lower plate 1060 has a groove 1062 formed therein as in FIGS. 14 and 15. In FIGS. 16 and 17, an upper plate 1070 also has a groove 1072 formed in it. The groove 1072 is parallel to the groove 1062 so that a fiber 1080 can rest in the two grooves 1062, 1072 between the two plates 1060, 1070. In this embodiment, the angle of the groove 1062 and the angle of the groove 1072 should be selected so that the distribution of the pressure applied to the fiber is such that the applied index perturbation is as azimuthally symmetric as possible. Although several combinations of angles are possible, a preferred embodiment involves using an angle of 90° for both the angle of the groove 1062 and the angle of the groove 1072. With this arrangement, when pressure is applied to the two plates 1060, 1070, the fiber 1080 is squeezed between the upper plate 1070 and the lower plate 1060, and the fiber 1080 has pressure applied to it at four substantially orthogonal locations at each ridge 1082 of the lower plate 1060. The embodiment of FIGS. 16 and 17 thus further equalizes the index changes to reduce or eliminate the polarization dependency. The azimuthally symmetric embodiments disclosed herein may be combined in a tandem configuration (such as the embodiment shown in FIG. 9) to produce a filter whose optical output is even less dependent on polarization.

Because the grooves of the embodiments of FIGS. 14–17 fix the orientation of the optical fibers 1024 and 1080 with respect to the ridges of the respective lower plates 1010, 1060, the angle of each fiber with respect to the ridges cannot be readily adjusted. FIG. 18 illustrates an exemplary lower plate 2000 which provides an adjustable periodicity. In particular, the plate 2000 includes a plurality of ridges 2010 formed as discussed above, which are intersected by a plurality of non-parallel grooves passing through the ridges. The plate 2000 further includes a first V-shaped groove 2020 which is oriented at a first angle orthogonal (i.e., perpendicular) to the ridges 2010. The plate 2000 further includes a second V-shaped groove 2022 which is oriented at a second, non-orthogonal angle to the ridges 2010 which causes the second groove 2022 to have an angle $\theta_2$ with respect to a line orthogonal to the ridges 2010. The lower plate includes a third V-shaped groove 2024 which is oriented at a third non-orthogonal angle to the ridges 2010 which causes the third groove 2024 to be oriented at a second angle $\theta_3$ with respect to a line perpendicular to the ridges 2010. Additional grooves at other different angles can also be formed in the lower plate 2000. Each of the grooves 2020, 2022, 2024 provides a different periodicity in accordance with the angle of orientation of the groove with respect to the ridges 2010. A top plate (not shown) may be advantageously used to press a fiber into one of the grooves 2020, 2022, 2024.

FIGS. 19 and 20 illustrate a further embodiment of the present invention in which a lower plate 2100 is formed with ridges 2110 as before. Unlike the previous embodiments, a groove 2120 is formed in the lower plate 2100 as a curve which intersects the ridges 2110 at differing angles. Thus, a fiber 2130 positioned in the groove 2120 and pressed between the lower plate 2100 and an upper plate 2140 will not experience a constant periodicity, which causes the linewidths of the attenuation to broaden. Thus, the embodiment of FIGS. 19 and 20 will operate as a chirped grating.

FIGS. 21 and 22 illustrate an alternative embodiment of the chirped grating in which a lower plate 2200 has a plurality of ridges 2210 formed in it. Unlike the previous embodiments, the ridges 2210 are not evenly spaced, but instead have a varying periodicity from a first period $\Lambda_1$ to a second period $\Lambda_2$. By varying the period Λ over a limited range, the linewidth of the transmission notches of the filter is broadened. Although the embodiment of FIGS. 21 and 22 can be used with or without a groove, a groove 2220 is shown. A fiber 2230 is squeezed between the lower plate 2200 and an upper plate 2240. The polarization-independent embodiments herein can be used to produce a variety of spectral filter shapes, with the filter shape being controlled, for example, by adjusting the chirped grating length or adjusting the curvature of the fiber between its plates.

As illustrated above in connection with FIG. 13, the long-period fiber grating filter in accordance with the present invention displays a significant polarization dependence using single-mode optical fiber. The two peaks 960, 962 in the attenuation are approximately 4 nanometers apart.

Figure 25:
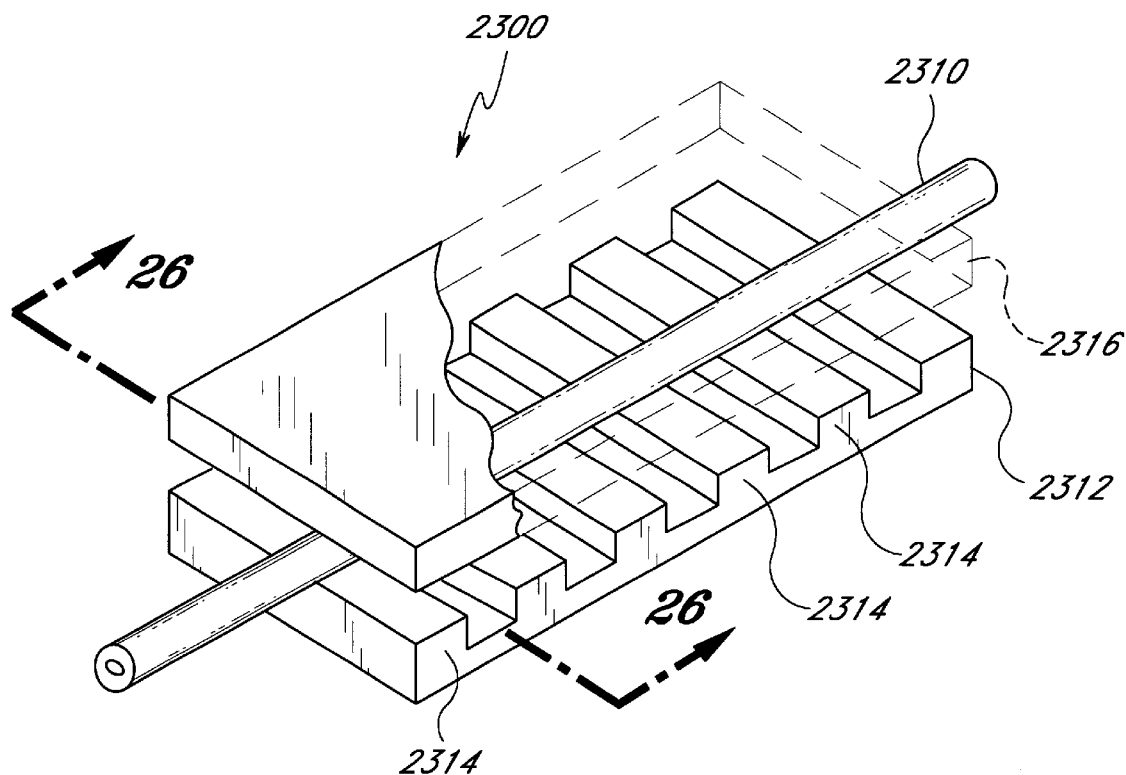
FIGS. 25 and 26 illustrate an embodiment designed for polarization maintaining fiber, which increases the separation between attenuation peaks corresponding to different polarizations.
Figure 26:
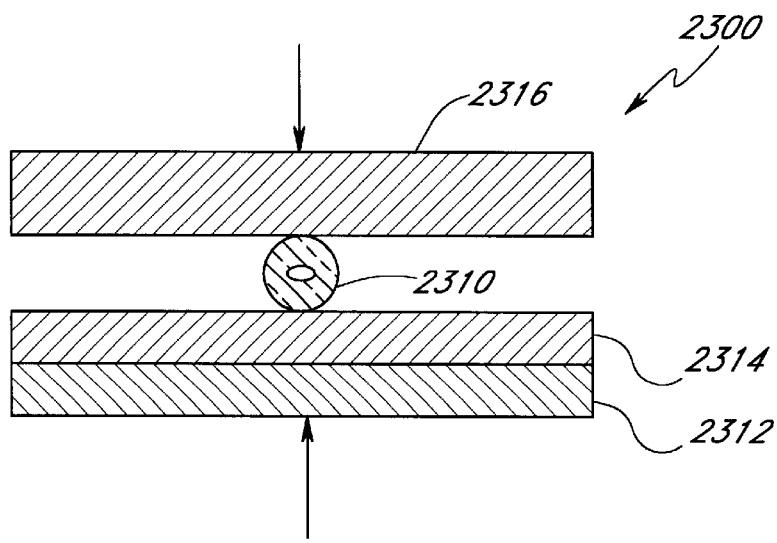

Furthermore, as illustrated for the peak 962 of the second polarization at approximately 1,525 nanometers, light propagating in the first polarization incurs approximately 4.5 dB of attenuation, while light propagating in the second polarization incurs approximately 14 dB of attenuation at this wavelength. Similarly, at the peak of the first polarization at approximately 1,528.5 nanometers, light propagating in the first polarization incurs approximately 12 dB of attenuation while light propagating in the second polarization incurs only approximately 4.5 dB of attenuation at this wavelength. This embodiment can therefore be used as a polarizer. However, although the differences in attenuation are significant, the less attenuated light incurs substantial attenuation in each case which is undesirable if this filter is used as a polarizer. Thus, it would be desirable to separate the attenuation peaks so that the peak attenuation for one polarization occurs at a wavelength where the other polarization incurs little, if any, attenuation. This is accomplished in accordance with another aspect of the present invention by using a polarization-maintaining fiber (i.e., high birefringence fiber) in place of the low birefringence fiber previously described. In particular, as illustrated by the system 2300 in FIGS. 25 and 26, a polarization-maintaining fiber 2310 (represented as having an elliptical core) is positioned between a first plate 2312 having a plurality of ridges 2314 formed thereon and a second generally flat plate 2316.

Figure 28A:
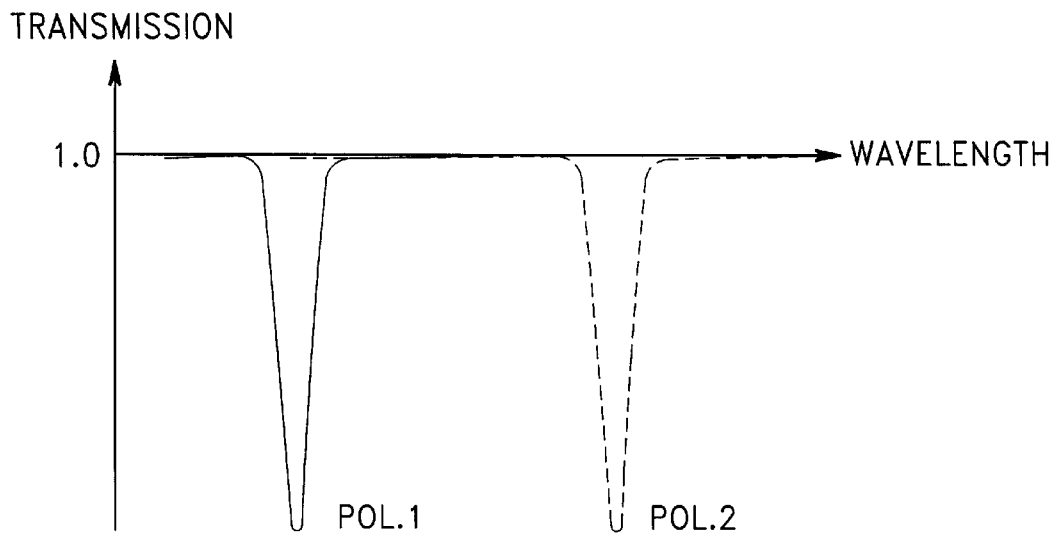
FIGS. 28A and 28B illusive transmission spectra for gratings which are not chirped and chirped, respectively, in which the transmission notches correspond to orthogonal polarizations.

In a preferred embodiment, one of the birefringence axes of the polarization-maintaining fiber 2310 is aligned with the direction of the pressure applied to the fiber, for example, the slow axis of the fiber is parallel to the top surface of the plate 2316, while the fast axis of the fiber is perpendicular to the surface of the plate 2316. In a polarization-maintaining fiber, at a given wavelength the two eigen-polarization modes have very different mode effective indices $n_{eff}$. However, because the fiber cladding is circular, the cladding modes of the polarization-maintaining fiber have essentially the same effective indices $n_{cl}^m$ for the two eigen-polarizations. Consequently, for a given cladding mode number m, the condition given by Equation 1 is generally satisfied for different peak attenuation wavelengths $\lambda_m$ for the two polarizations. In other words, the transmission notches of the filter for orthogonal polarizations are widely separated, as illustrated in FIG. 28A. In general, the bandwidth of each of these two transmission notches should be smaller than the separation between notches ($\lambda_m^s - \lambda_m^f$), so that the notches do not overlap or overlap very little, since the device acts as a relatively poor polarizer at wavelengths in the overlap regions. How much smaller will depend on properties of the polarization-maintaining fiber, in particular on its birefringence. This filter acts as a polarizer that (1) rejects a first polarization but does not attenuate the second, orthogonal polarization at (and around) $\lambda_m^f$ and (2) rejects the second polarization but does not attenuate the first polarization at (and around) $\lambda_m^s$. By increasing the separation of the peak attenuation wavelengths, the peak attenuation of light in one polarization is caused to occur at a wavelength for which the other polarization has less attenuation than its counterpart shown in FIG. 13. Thus, the polarization-maintaining fiber in combination with the ridges of a long-period fiber grating can be used as an all-fiber polarizer.

A benefit of this embodiment is that the location of the peak wavelengths $\lambda_m^s$ and $\lambda_m^f$ can be tuned continuously over some finite range by rotating the fiber 2310 about its axis prior to applying the pressure, so that the fast axis of the fiber 2310 lies at an angle θ with respect to the pressure plate 2316. The embodiment discussed in the previous paragraph corresponds to a slow axis angle θ=0°. By increasing this angle, the peak wavelengths $\lambda_m^s$ and $\lambda_m^f$ can be both varied continuously over some finite range, permitting adjustment of the polarizer so that it attenuates most strongly at the desired wavelength.

Figure 23:
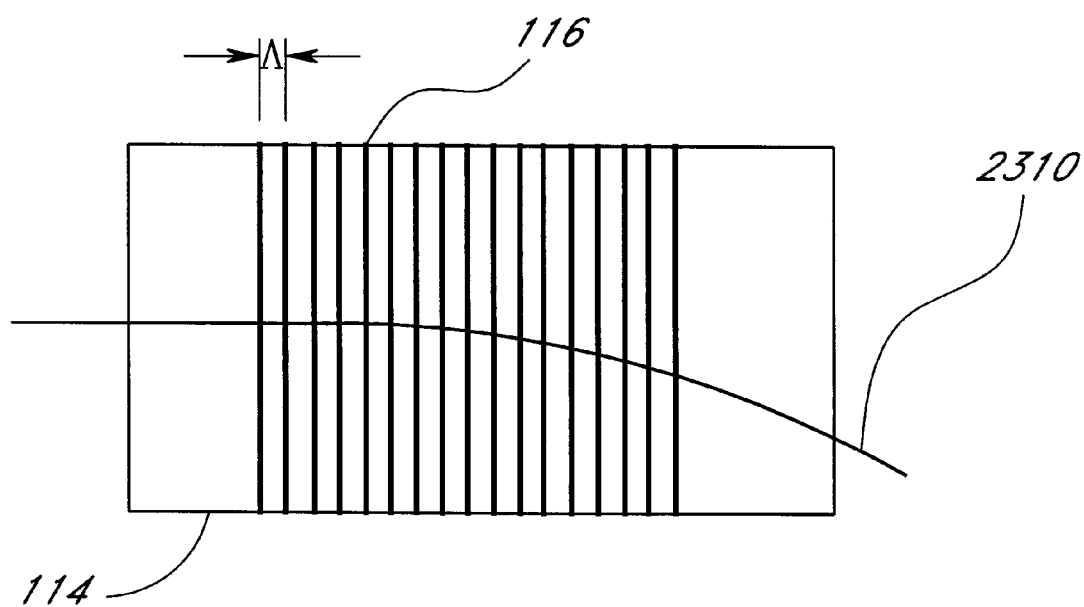
FIGS. 23 and 24 illustrate plan views of chirped grating embodiments utilizing polarization maintaining fiber in which the ridges are spaced periodically and aperiodically from each other, respectively.
Figure 24:
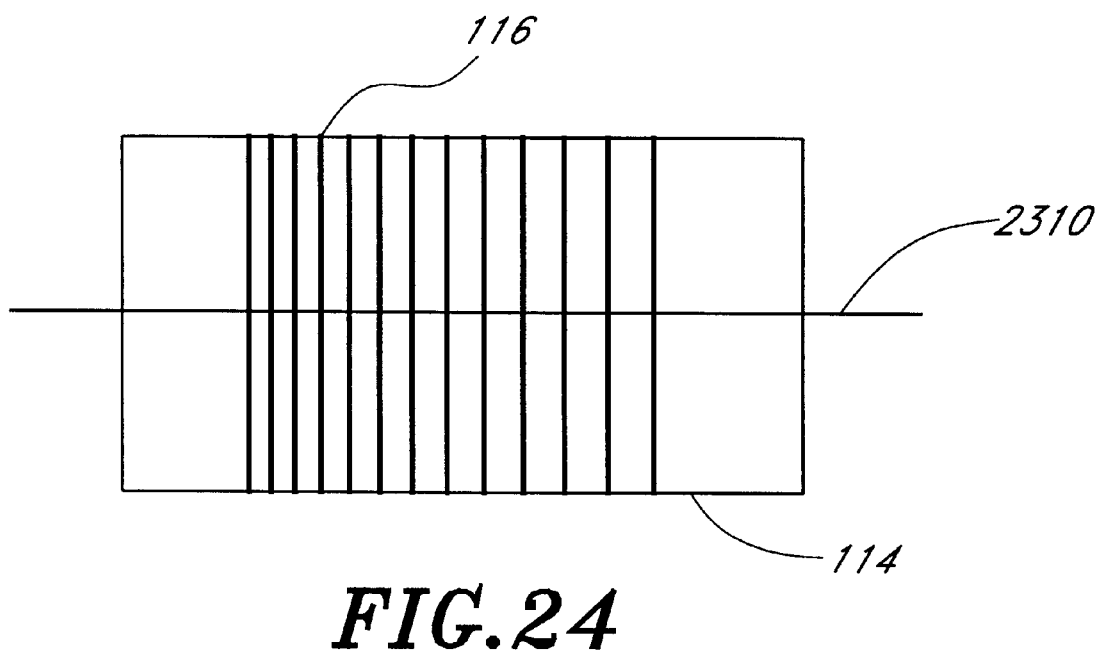

FIG. 24 shows a second embodiment of a fiber polarizer. A polarization maintaining fiber 2310 is pressed against aperiodically spaced ridges 116 by a plate (not shown in FIG. 24). In FIG. 24 the spacing between the ridges 116 is chirped, in contrast to the embodiment of FIGS. 25–26. FIG. 23 illustrates a third embodiment of a fiber polarizer device which likewise has a broad bandwidth. In this embodiment, the polarization maintaining fiber 2310 contacts a periodic grating, but the fiber is bent in a predetermined fashion to produce the desired chirping. Once again, a plate (not shown in FIG. 23) presses the polarization maintaining fiber 2310 against the ridges 116. For each of the embodiments illustrated in FIGS. 23 and 24, one of the birefringence axes of the polarization-maintaining fiber 2310 is advantageously aligned with the direction of the pressure applied to the fiber, as in the embodiment of FIGS. 25 and 26.

Figure 28B:
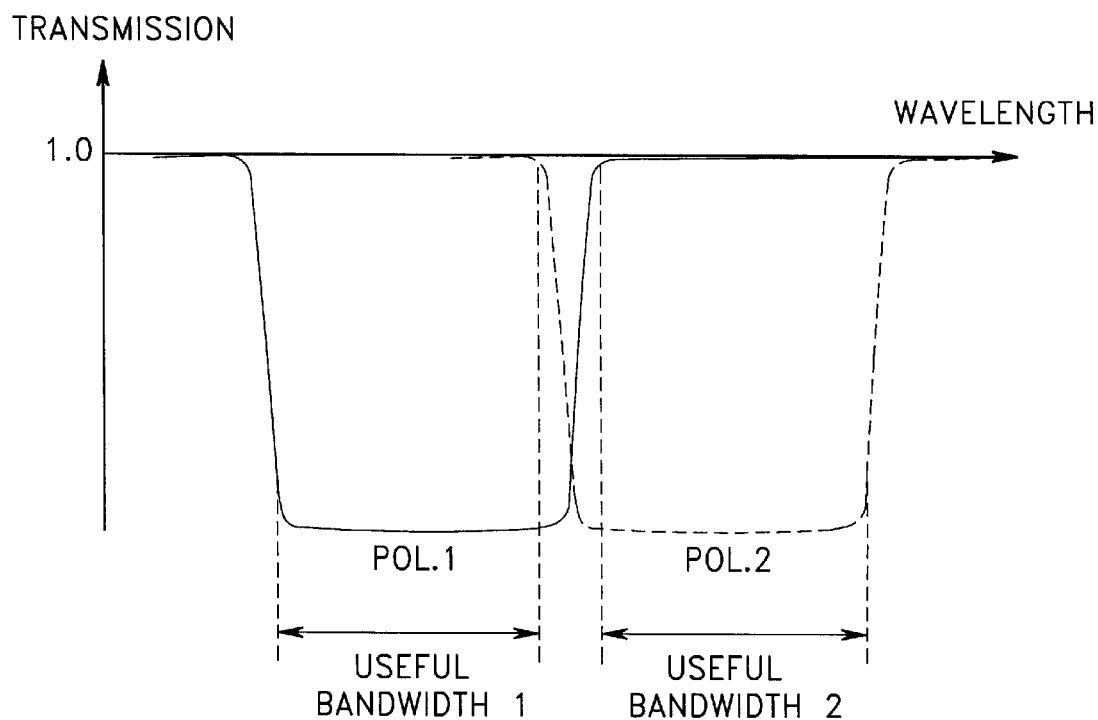

As discussed in connection with FIGS. 21–22, the effect of an aperiodic grating is to broaden the linewidth of the device's transmission notches, thereby increasing the useful bandwidth of the polarizer. Specifically, the wavelength range over which a first polarization is attenuated is increased, while the wavelength range over which a second, orthogonal polarization is attenuated is also increased. This situation is illustrated in FIG. 28B, in which two orthogonal polarizations (pol. 1 and pol. 2) have respective useful bandwidths which adjoin each other. FIG. 28B represents the situation which may be generated by the embodiments shown in FIGS. 23 and 24. In FIG. 28B, the amount of chirping in the corresponding grating is selected such that the transmission notches are substantially broader than they would be in the absence of chirping (FIG. 28A). However, the amount of chirping is preferably not so strong that the transmission notches overlap each other, since in this case signal wavelengths in the overlap region would be strongly attenuated for both polarizations, which for most applications would be undesirable. Thus, the chirping in the grating is preferably selected such that the gap between the notches of FIG. 28A is just filled in, thereby producing a maximum useful bandwidth for the polarizer. In useful bandwidth 1 of FIG. 28B, a signal with polarization 1 is attenuated while a signal with the same wavelength having an orthogonal polarization (polarization 2) is transmitted. In useful bandwidth 2, on the other hand, the situation is reversed, so that a signal having polarization 2 is attenuated while a signal at the same wavelength having polarization 1 is transmitted.

Figure 27A:
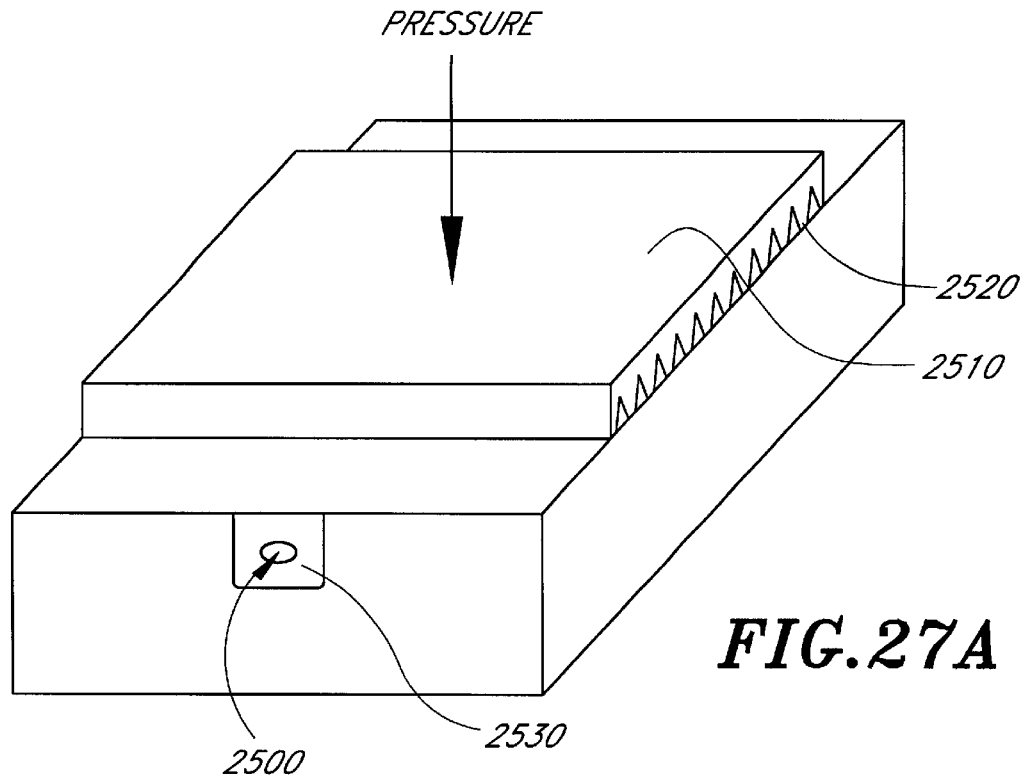
FIGS. 27A and 27B illustrate optical waveguide embodiments which function as optical polarizers.
Figure 27B:
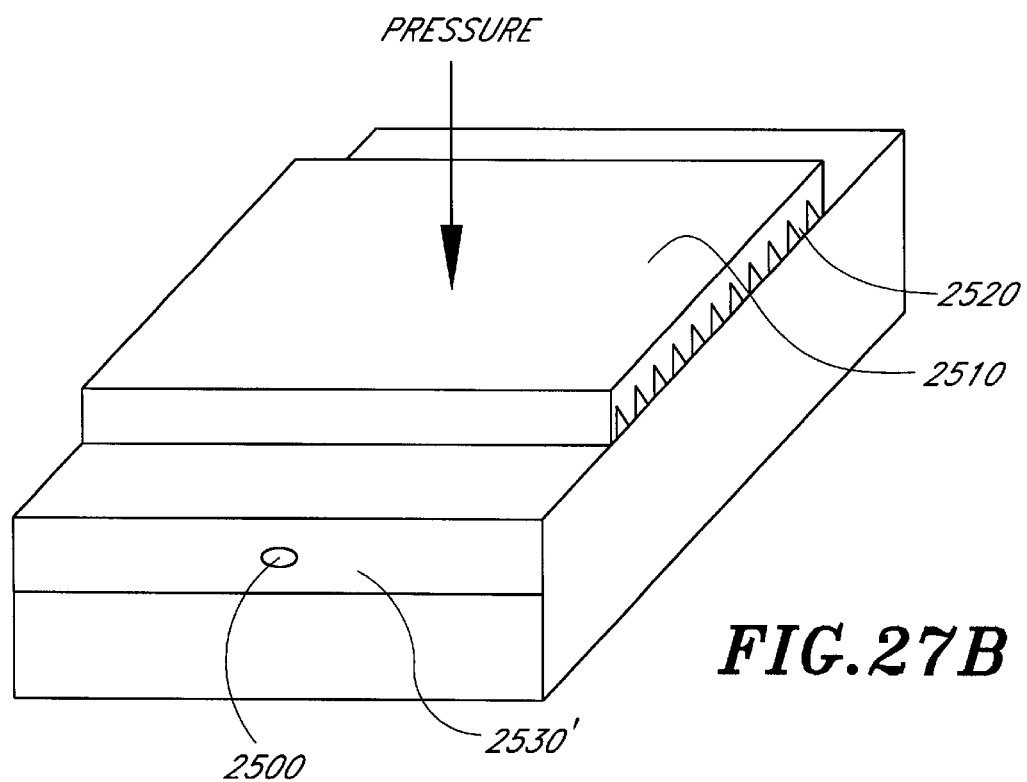

FIGS. 27A and 27B illustrate another embodiment of this invention utilizing an integrated optic waveguide 2500 to carry light and a plate 2510 having a plurality of ridges 2520 pressed against the surface of the waveguide. The waveguide 2500 is provided with a cladding region 2530 (2530') which can have one of several shapes, two of which are illustrated in FIGS. 27A and 27B. The plate 2510 acts to couple light from the fundamental (or a higher order) guided mode of the waveguide 2500 to a guided mode of the cladding 2530 (2530'). This coupling is wavelength dependent, so that this device acts as a notch filter. The ridges 2520 on the pressure plate 2510 can be periodically spaced to produce the filter transmission function given approximately by Equation 2. Alternatively, the ridges 2520 on the pressure plate 2510 can have an arbitrary spatial distribution so as to produce a more complex filter transmission function. The cladding 2530 (2530') can be made of a composite and/or multilayer material, as discussed earlier, to minimize the temperature dependence of the filter transmission spectrum. The shape of the cladding 2530 (2530'), in particular its diameter, controls the index of the cladding modes and can be tailored to produce the desired center wavelengths for the filter notches. In the configurations shown in FIGS. 27A and 27B, if the guide 2500 exhibits low birefringence, the filter transmission spectrum is slightly polarization dependent. On the other hand, if the guide 2500 exhibits high birefringence (comparable to what is readily achievable in integrated optic and fiber optics waveguides), the filter has a strongly polarization dependent transmission spectrum and can be used as a polarizer. The ridges 2520 can then be chirped to widen the bandwidth of the polarizer, as described above in relation to fiber optic filters.

While preferred embodiments of this invention have been disclosed herein, those skilled in the art will appreciate that changes and modifications may be made therein without departing from the spirit and scope of the invention as defined in the appended claims.

What is claimed is:

1. A method of forming an optical filter, comprising:
    applying pressure at various points along a segment of an optical waveguide to induce perturbations in the refractive index and create a grating within the waveguide, the segment being less than approximately 2 inches in length; and
    selecting the pressure and relative spacings between the pressure points such that optical radiation passing through the waveguide is more strongly attenuated at some wavelengths than at other wavelengths.

2. The method of claim 1, wherein the waveguide includes an optical fiber.

3. The method of claim 2, wherein the fiber includes a single-mode fiber.

4. An optical filter, comprising:
    an optical waveguide; and
    a device for maintaining pressure along less than about 5 cm of said waveguide to induce local changes in the index of refraction, the induced changes in the index of refraction creating an optical grating within said waveguide that attenuates optical radiation passing through said waveguide more strongly at some wavelengths than at other wavelengths.

5. The optical filter of claim 4, wherein said optical waveguide includes an optical fiber.

6. The optical filter of claim 5, wherein said fiber includes a single-mode fiber.

7. The optical filter of claim 4, in which said waveguide is polarization maintaining to vary the polarization dependence of the attenuated optical radiation.

8. The optical filter of claim 4, said device comprising two plates, one of said plates having ridges for applying pressure to said waveguide.

9. The optical filter of claim 8, said ridged plate having a plurality of periodically spaced ridges for applying pressure to said waveguide.

10. A method of forming an optical filter, comprising:
    applying pressure at various points along a segment of an optical waveguide having a cladding, to induce perturbations in the refractive index and create a grating within the optical waveguide, the segment being less than approximately 5 cm in length; and
    selecting the pressure and the relative spacings between the pressure points such that optical radiation passing through the optical waveguide is more strongly coupled into the cladding at some wavelengths than at other wavelengths, so that the waveguide acts as an optical filter.

11. The method of claim 10, wherein the optical waveguide includes an to optical fiber.

12. The method of claim 11, wherein the fiber includes a single-mode fiber.

13. A method of forming an optical filter having reduced polarization dependence, comprising:
    applying pressure to an optical waveguide by pressing the waveguide into a plurality of periodically spaced grooves that are generally V-shaped, said applied pressure inducing perturbations in the refractive index of the waveguide to create a grating within the waveguide, the pressure being applied in substantially equal measure between orthogonal axes; and
    selecting the relative spacings between the pressure points such that optical radiation passing through the waveguide is more strongly attenuated at some wavelengths than at other wavelengths, so that the waveguide acts as an optical filter.

14. The method of claim 13, wherein the optical waveguide includes an optical fiber.

15. The method of claim 14, wherein the optical fiber includes a single-mode fiber.

16. An optical filter, comprising:
    an optical waveguide; and
    a device for maintaining pressure along said waveguide to induce local changes in the index of refraction, the induced changes in the index of refraction creating an optical grating within said waveguide that attenuates optical radiation passing through said waveguide more strongly at some wavelengths than at other wavelengths, said device having periodically spaced, generally V-shaped grooves for receiving said waveguide, said V-shaped grooves causing the pressure to be applied substantially symmetrically to said filter to reduce the polarization dependence of said filter.

17. The optical filter of claim 16, wherein said waveguide includes an optical fiber.

18. The optical filter of claim 17, wherein said fiber includes a single-mode fiber.

19. A method of forming an optical filter, comprising:
    applying pressure to an optical waveguide by pressing the waveguide into a groove that passes through a plurality of periodically spaced ridges, said groove being generally V-shaped within said ridges, said applying pressure inducing perturbations in the refractive index of the waveguide to create a grating within the waveguide, the pressure being applied substantially equally between orthogonal axes of the waveguide;
    selecting the relative spacings between the ridges such that optical radiation passing through the waveguide is more strongly attenuated at some wavelengths than at other wavelengths, so that the waveguide acts as an optical filter.

20. The method of claim 19, wherein the optical waveguide includes a single-mode fiber.

21. The method of claim 19, farther comprising simultaneously applying pressure to the waveguide by pressing the waveguide into a second groove, the second groove being generally V-shaped.

22. An optical filter, comprising:
    an optical waveguide; and
    a device for maintaining pressure along said waveguide to induce local changes in the index of refraction, the induced changes in the index of refraction creating an optical grating within said waveguide that attenuates optical radiation passing through said waveguide more strongly at some wavelengths than at other wavelengths, said device having at least one groove for receiving said waveguide, said groove passing through a plurality of periodically spaced ridges where said groove is generally V-shaped, said groove causing the pressure to be applied substantially equally between orthogonal axes of said waveguide.

23. The optical filter of claim 22, wherein said optical waveguide includes an optical fiber.

24. The optical filter of claim 23, wherein said fiber includes a single-mode fiber.

25. The optical filter of claim 22, further comprising a second groove for receiving said waveguide, said second groove passing through said plurality of periodically spaced ridges, said second groove being non-parallel with respect to said first groove, the period of said ridges of said second groove causing said filter to attenuate light more strongly at different wavelengths than when said waveguide is in said first groove.

26. A method of forming an optical chirped grating, comprising:
applying pressure at various points along an optical waveguide to induce perturbations in the refractive index and create a grating within the waveguide; and
selecting the relative spacings between the pressure points such that optical radiation passing through the waveguide is more strongly attenuated at some wavelengths than at other wavelengths, so that the waveguide acts as an optical filter, wherein the relative spacings are aperiodic to broaden the linewidth of the attenuation of the filter.

27. The method of claim 26, wherein the optical waveguide includes an optical fiber.

28. The method of claim 26, said applying pressure comprising urging the waveguide into a V-shaped groove which passes through a series of ridges.

29. The method of claim 28, wherein the ridges are aperiodically spaced from each other.

30. The method of claim 28, wherein the ridges are periodically spaced from each other, but the optical waveguide is curved with respect to the ridges so that the relative spacing between the pressure points is aperiodic.

31. The method of claim 26, said applying pressure comprising urging the waveguide against a plurality of ridges.

32. The method of claim 31, wherein the ridges are aperiodically spaced from each other.

33. The method of claim 31, wherein the ridges are periodically spaced from each other, but the optical waveguide is curved with respect to the ridges so that the relative spacing between the pressure points is aperiodic.

34. An optical chirped grating, comprising:
an optical waveguide; and
a device for maintaining pressure along said waveguide to induce local changes in the index of refraction, the induced changes in the index of refraction creating an optical grating within said waveguide that attenuates optical radiation passing through said waveguide more strongly at some wavelengths than at other wavelengths, wherein pressure is applied to said waveguide aperiodically.

35. The grating of claim 34, wherein said optical waveguide includes an optical fiber.

36. The grating of claim 34, comprising a V-shaped groove that passes through a series of ridges, said device maintaining pressure on said waveguide by urging said waveguide into said groove.

37. The grating of claim 36, wherein said ridges are aperiodically spaced from each other.

38. The grating of claim 36, wherein said ridges are periodically spaced from each other, but said optical waveguide is curved with respect to said ridges so that the relative spacing between the pressure points is aperiodic.

39. The grating of claim 34, comprising a plurality of ridges, said device maintaining pressure on said waveguide by urging said waveguide against said plurality of ridges.

40. The grating of claim 39, wherein said ridges are aperiodically spaced from each other.

41. The grating of claim 39, wherein said ridges are periodically spaced from each other, but said optical waveguide is curved with respect to said ridges so that the relative spacing between the pressure points is aperiodic.

42. An optical filter, comprising:
an optical waveguide, said waveguide including a core for propagating a fundamental mode and including a cladding surrounding said core;
a first device for maintaining pressure at a first plurality of periodically spaced pressure points along said waveguide so that the index of said waveguide is perturbed periodically, the period between said first pressure points and the pressure applied to said first pressure points selected to couple the fundamental mode to a cladding mode of said cladding;
a second device for maintaining pressure at a second plurality of periodically spaced pressure points along said waveguide so that the index of said waveguide is perturbed periodically, the period between said second pressure points and the pressure applied to said second pressure points selected to couple the fundamental mode to a cladding mode of said cladding, wherein the pressure applied by said first device and the pressure applied by said second device are applied in different directions to reduce the polarization dependence of light transmitted through said filter.

43. The filter of claim 42, wherein said optical waveguide includes a single-mode optical fiber.

44. The filter of claim 42, wherein said first device and said second device include devices which apply pressure to said waveguide with azimuthal symmetry to further reduce the polarization dependence of said filter.

45. The filter of claim 42, wherein the pressure applied by said first device and the pressure applied by said second device are applied in substantially orthogonal directions, so that said filter is substantially polarization independent.

46. An optical filter, comprising:
an optical waveguide, said waveguide including a core and a cladding; and
a device for maintaining pressure at a plurality of points periodically spaced along said waveguide, the pressure inducing perturbations in the refractive index of said waveguide and creating an optical grating within said waveguide, so that a fundamental mode of the core of said waveguide is coupled to a cladding mode of said waveguide more strongly at some wavelengths than at other wavelengths to produce an optical filter, said device applying pressure to said waveguide with azimuthal symmetry that is at least 3-fold, so that light incident on said waveguide passes through said waveguide substantially independently of the polarization of the incident light.

47. The filter of claim 46, wherein said optical waveguide includes a single-mode optical fiber.

48. The filter of claim 46, wherein said device comprises a cylinder having an inner surface, said cylinder including ridges that adjoin the inner surface and apply pressure to said waveguide.

49. The filter of claim 48, wherein said cylinder is divided into more than one piece, wherein said pieces are clamped together to form said cylinder.

50. The filter of claim 46, wherein said device comprises two plates that compress said waveguide, one of said plates having a series of ridges through which a first groove is cut, said first groove receiving said waveguide.

51. The filter of claim 50, including a second groove for receiving said waveguide, wherein said second groove is cut through said ridges at an angle different from said first groove, such that said filter has transmission properties that depend upon which of said grooves receives said waveguide.

52. The filter of claim 50, wherein said groove intersects with said ridges to form a V-shape.

53. The filter of claim 50, wherein both of said plates have grooves therein, such that said waveguide can be simultaneously received by both a groove in said first plate and a groove in said second plate.

54. A method of forming an optical filter, comprising:
providing an optical waveguide that includes a core and a cladding;
applying pressure at a plurality of points along the waveguide to induce perturbations in the refractive index and create an optical grating within the waveguide, so that a fundamental mode in the core of the waveguide is coupled to a cladding mode of the waveguide more strongly at some wavelengths than at other wavelengths, wherein the pressure is applied with sufficient azimuthal symmetry to substantially reduce the polarization dependence of light passing through the waveguide.

55. The method of claim 54, wherein the plurality of points are spaced periodically from each other.

56. The method of claim 54, wherein pressure is applied to the waveguide with at least 3-fold azimuthal symmetry.

57. The method of claim 54, wherein the optical waveguide includes a single-mode fiber.

58. An optical filter, comprising:
an optical waveguide, said waveguide including a core and a cladding; and
a device for maintaining pressure at a plurality of points aperiodically spaced along said waveguide, the pressure inducing perturbations in the refractive index of said waveguide and creating a chirped optical grating within said waveguide, so that a fundamental mode of the core of said waveguide is coupled to a cladding mode of said waveguide more strongly at some wavelengths than at other wavelengths to produce an optical filter.

59. The filter of claim 58, wherein said optical waveguide includes a single-mode optical fiber.

60. The filter of claim 58, said device applying pressure to said waveguide with azimuthal symmetry that is at least 3-fold, so that light incident on said waveguide passes through said waveguide substantially independently of the polarization of the incident light.

61. The filter of claim 58, said device applying pressure to said waveguide asymmetrically so that said filter is polarization dependent.

62. An optical polarizer, comprising:
a high-birefringence optical waveguide having birefringence axes; and
a device for applying pressure at various points along said waveguide to induce local changes in the index of refraction, the induced changes in the index of refraction creating an optical grating within said waveguide that attenuates optical radiation passing through said waveguide more strongly at some wavelengths than at other wavelengths, wherein the more strongly attenuated optical radiation has a polarization state different from the optical radiation at said other wavelengths that is transmitted by said waveguide.

63. The polarizer of claim 62, wherein said optical waveguide includes a single-mode optical fiber.

64. The polarizer of claim 62, wherein one of the birefringence axes is aligned with the direction of the pressure applied by said device.

65. The polarizer of claim 62, said waveguide being rotatable within said device about a longitudinal axis of said waveguide to vary bow optical radiation passing through said waveguide is attenuated as a function of wavelength.

66. The polarizer of claim 62, wherein the pressure points are aperiodically spaced along said waveguide to increase the spectral range over which said filter acts as a polarizer.

67. The polarizer of claim 66, wherein pressure is applied to said waveguide with a ridged plate.

68. The filter of claim 67, wherein said ridges are aperiodically spaced on said plate.

69. The filter of claim 67, wherein said ridges are periodically spaced on said plate, said waveguide being bent along an arcuate curve with respect to said ridges.

70. An optical polarizer, comprising:
an integrated optic waveguide for propagating a fundamental mode and a substrate mode; and
a plate having ridges pressed against said waveguide, said ridges applying pressure at points along said waveguide so that, for light within a given bandwidth, a first polarization of the light is coupled more strongly from the fundamental mode to the substrate mode than is the polarization of light orthogonal to the first polarization, leading to preferential attenuation of the first polarization of the light.

71. The polarizer of claim 70, wherein the orthogonal polarization is substantially uncoupled to the substrate mode.

72. The polarizer of claim 70, wherein said ridges are spaced aperiodically from each other to increase the spectral range over which said polarizer operates.

73. The polarizer of claim 70, wherein said waveguide includes a single-mode fiber.

74. An optical filter, comprising:
an integrated optic waveguide for propagating a fundamental mode and a substrate mode; and
a plate having ridges pressed against said waveguide, said ridges applying pressure at points along said waveguide so that, for light coupled into said waveguide, a first bandwidth of the light is coupled more strongly from the fundamental mode to the substrate mode than is a second bandwidth of the light, leading to preferential attenuation of the first bandwidth of the light.

75. The filter of claim 74, wherein the second bandwidth is substantially uncoupled to the substrate mode.

76. The filter of claim 74, wherein said ridges are spaced aperiodically from each other to increase the spectral range over which said filter operates.

77. The filter of claim 74, wherein said waveguide includes a single-mode fiber.

78. An optical filter, comprising:
an optical waveguide; and
a device for maintaining pressure along at least a portion of said waveguide, said device including rows of ridges, said ridges contacting said waveguide at various points along said waveguide to induce local changes in the index of refraction, the induced changes in the index of refraction creating an optical grating within said waveguide that attenuates optical radiation passing through said waveguide more strongly at some wavelengths than at other wavelengths, said rows periodically spaced from each other such that said points are periodically spaced from each other, said rows having different lengths such that the length of said portion over which pressure is maintained can be varied by positioning said waveguide at different locations on said device without changing the periodicity between said points.

79. The optical filter of claim 78, wherein said optical waveguide includes a single-mode fiber.

80. A method of forming an optical filter, comprising:

applying tension to an optical waveguide to avoid microbending in the waveguide and thereby reduce optical losses;

applying pressure at various points along a segment of the waveguide to induce perturbations in the refractive index and create a grating within the waveguide; and selecting the pressure and relative spacings between the pressure points such that optical radiation passing through the waveguide is more strongly attenuated at some wavelengths than at other wavelengths.

81. The method of claim 80, wherein the optical waveguide includes a single-mode fiber.

82. An optical filter, comprising:

an optical waveguide; and a device for maintaining pressure along at least a portion of said waveguide, said device including ridges which contact said waveguide at various points to induce local changes in the index of refraction, the induced changes in the index of refraction creating an optical grating within said waveguide that attenuates optical radiation passing through said waveguide more strongly at some wavelengths than at other wavelengths, said ridges having generally rounded corners to avoid microbending in said waveguide and thereby reduce optical losses within said waveguide.

83. The optical filter of claim 82, wherein said optical waveguide includes a single-mode fiber.

84. An optical filter, comprising:

an optical waveguide; and a device for maintaining pressure along at least a portion of said waveguide, said device including rows of ridges, said ridges intersected by a plurality of grooves passing through said ridges which accept said waveguide, said ridges applying pressure to said waveguide to induce local changes in the index of refraction, the induced changes in the index of refraction creating an optical grating within said waveguide that attenuates optical radiation passing through said waveguide more strongly at some wavelengths than at other wavelengths.

85. The filter of claim 84, wherein said grooves are non-parallel so that said ridges along a first one of said grooves have a first periodic spacing and said ridges along a second one of said grooves have a second periodic spacing, the first and second periodic spacings being different such that the periodicity of the optical grating created within said waveguide varies between said grooves, such that said filter has different transmission spectra which depend upon which of said grooves is used.

86. The filter of claim 84, wherein said waveguide includes a single-mode fiber.

87. A method of forming an optical polarizer, comprising:

providing a polarization-maintaining optical waveguide having birefringence axes, the waveguide propagating a fundamental mode and a substrate mode; and creating an optical grating within the waveguide by applying pressure at various points along the waveguide to induce changes in the index of refraction in the waveguide, such that a first polarization of optical radiation within a given bandwidth is more strongly coupled from the fundamental mode to the substrate mode than is the orthogonal polarization of optical radiation within the bandwidth, leading to preferential attenuation of the first polarization of the optical radiation within the bandwidth.

88. The method of claim 87, comprising aligning one the birefringence axes with the direction of the pressure applied by the device to enhance the attenuation of the first polarization of the optical radiation.

89. The method of claim 87, comprising rotating the waveguide about a longitudinal axis of the waveguide to vary the polarization dependence of the optical radiation attenuated by the polarizer.

90. The method of claim 87, wherein the waveguide includes a single-mode fiber.

91. A method of varying the relative strength of transmission notches in a filter, comprising:

applying pressure at various points along a segment of an optical waveguide to induce perturbations in the refractive index and create a grating within the waveguide;

selecting the pressure and relative spacings between the pressure points such that optical radiation passing through the waveguide is more strongly attenuated at some wavelengths than at other wavelengths, the attenuation strength at one wavelength and the attenuation strength at another wavelength defining a relative magnitude of the attenuation strengths of the one and the another wavelengths; and varying the applied pressure to change the relative magnitude of the attenuation strengths.

92. The method of claim 91, wherein the waveguide includes a single-mode fiber.

93. A method of forming a temperature insensitive optical filter, comprising:

applying pressure at various points along a segment of an optical waveguide to induce perturbations in the refractive index and create a grating within the waveguide, the optical waveguide including a core which propagates a fundamental mode and a cladding surrounding the core which propagates cladding modes, wherein the cladding and the core have index profiles selected such that the cladding modes and the fundamental mode of the core have substantially identical effective index temperature dependence; and selecting the pressure and relative spacings between the pressure points such that the fundamental mode is coupled to a cladding mode more strongly, and thereby more strongly attenuated, at some wavelengths than at other wavelengths, such that the filter has a transmission spectrum exhibiting a temperature dependence that is reduced by the index profiles of the cladding and the core.

94. The method of claim 93, wherein the cladding includes layers of different materials having different refractive index thermal coefficients.

95. The method of claim 93, wherein the waveguide includes a single-mode fiber.

* * * * *

UNITED STATES PATENT AND TRADEMARK OFFICE
CERTIFICATE OF CORRECTION

PATENT NO.    : 6,282,341 B1                                          Page 1 of 1
DATED         : August 28, 2001
INVENTOR(S)   : Michel J. F. Digonnet et al.

It is certified that error appears in the above-identified patent and that said Letters Patent is hereby corrected as shown below:

<u>Column 24,</u>
Line 56, please change "farther" to -- further --.

Signed and Sealed this

Fourth Day of June, 2002

*Attest:*

JAMES E. ROGAN
*Attesting Officer*       *Director of the United States Patent and Trademark Office*